US011755701B2

(12) United States Patent
Lesso

(10) Patent No.: US 11,755,701 B2
(45) Date of Patent: Sep. 12, 2023

(54) METHODS, APPARATUS AND SYSTEMS FOR AUTHENTICATION

(71) Applicant: Cirrus Logic International Semiconductor Ltd., Edinburgh (GB)

(72) Inventor: John Paul Lesso, Edinburgh (GB)

(73) Assignee: Cirrus Logic Inc., Austin, TX (US)

( * ) Notice: Subject to any disclaimer, the term of this patent is extended or adjusted under 35 U.S.C. 154(b) by 105 days.

(21) Appl. No.: 16/029,015

(22) Filed: Jul. 6, 2018

(65) Prior Publication Data
US 2019/0012448 A1   Jan. 10, 2019

Related U.S. Application Data

(60) Provisional application No. 62/529,780, filed on Jul. 7, 2017.

(30) Foreign Application Priority Data

Jan. 30, 2018 (GB) ..................... 1801526

(51) Int. Cl.
| | |
|---|---|
| *G06F 21/32* | (2013.01) |
| *H04R 5/033* | (2006.01) |
| *G10L 17/12* | (2013.01) |
| *H04R 1/10* | (2006.01) |
| *H04R 3/00* | (2006.01) |

(52) U.S. Cl.
CPC .............. *G06F 21/32* (2013.01); *G10L 17/12* (2013.01); *H04R 5/033* (2013.01); *H04R 1/1083* (2013.01); *H04R 3/005* (2013.01); *H04R 2410/00* (2013.01); *H04R 2460/01* (2013.01); *H04R 2460/13* (2013.01)

(58) Field of Classification Search
CPC ....... G06F 21/32; H04R 5/033; H04R 1/1083; H04R 2410/00; H04R 2460/12; H04W 12/65
USPC ......................................... 340/5.5
See application file for complete search history.

(56) References Cited

U.S. PATENT DOCUMENTS

| | | |
|---|---|---|
| 5,197,113 A | 3/1993 | Mumolo |
| 5,568,559 A | 10/1996 | Makino |
| 5,710,866 A | 1/1998 | Alleva et al. |

(Continued)

FOREIGN PATENT DOCUMENTS

| | | |
|---|---|---|
| AU | 2015202397 B2 | 5/2015 |
| CN | 1497970 A | 5/2004 |

(Continued)

OTHER PUBLICATIONS

International Search Report and Written Opinion of the International Searching Authority, International Application No. PCT/GB2018/053274, dated Jan. 24, 2019.

(Continued)

*Primary Examiner* — Vernal U Brown
(74) *Attorney, Agent, or Firm* — Jackson Walker L.L.P

(57) ABSTRACT

Methods, apparatus and systems for biometric authentication based on an audio signal are provided. The audio signal comprises a representation of a voice signal of a user conducted via at least part of a user's skeleton. Further embodiments may relate to biometric authentication based upon a combination of a bone-conducted audio signal, or a bone-conducted voice biometric process, with an air-conducted voice signal.

17 Claims, 10 Drawing Sheets

(56) References Cited

U.S. PATENT DOCUMENTS

| | | | |
|---|---|---|---|
| 5,787,187 | A | 7/1998 | Bouchard et al. |
| 6,182,037 | B1 | 1/2001 | Maes |
| 6,229,880 | B1 | 5/2001 | Reformato et al. |
| 6,249,237 | B1 | 6/2001 | Prater |
| 6,480,825 | B1 | 11/2002 | Sharma et al. |
| 7,016,833 | B2 | 3/2006 | Gable et al. |
| 7,039,951 | B1 | 5/2006 | Chaudhari et al. |
| 7,418,392 | B1 | 8/2008 | Mozer et al. |
| 7,492,913 | B2 | 2/2009 | Connor et al. |
| 8,442,824 | B2 | 5/2013 | Aley-Raz et al. |
| 8,489,399 | B2 | 7/2013 | Gross |
| 8,577,046 | B2 | 11/2013 | Aoyagi |
| 8,856,541 | B1 | 10/2014 | Chaudhury et al. |
| 8,997,191 | B1 | 3/2015 | Stark et al. |
| 9,049,983 | B1 | 6/2015 | Baldwin |
| 9,171,548 | B2 | 10/2015 | Valius et al. |
| 9,305,155 | B1 | 4/2016 | Vo et al. |
| 9,317,736 | B1 | 4/2016 | Siddiqui |
| 9,390,726 | B1 | 7/2016 | Smus et al. |
| 9,430,629 | B1* | 8/2016 | Ziraknejad .............. G06F 21/32 |
| 9,484,036 | B2 | 11/2016 | Kons et al. |
| 9,548,979 | B1 | 1/2017 | Johnson et al. |
| 9,613,640 | B1 | 4/2017 | Balamurali et al. |
| 9,641,585 | B2 | 5/2017 | Kvaal et al. |
| 9,646,261 | B2 | 5/2017 | Agrafioli et al. |
| 9,659,562 | B2 | 5/2017 | Lovitt |
| 9,665,784 | B2 | 5/2017 | Derakhshani et al. |
| 9,706,304 | B1 | 7/2017 | Kelso et al. |
| 9,865,253 | B1 | 1/2018 | De Leon et al. |
| 9,984,314 | B2 | 5/2018 | Philipose et al. |
| 9,990,926 | B1 | 6/2018 | Pearce |
| 10,032,451 | B1 | 7/2018 | Mamkina et al. |
| 10,063,542 | B1 | 8/2018 | Kao |
| 10,079,024 | B1 | 9/2018 | Bhimanaik et al. |
| 10,097,914 | B2 | 10/2018 | Petrank |
| 10,192,553 | B1 | 1/2019 | Chenier et al. |
| 10,204,625 | B2 | 2/2019 | Mishra et al. |
| 10,210,685 | B2 | 2/2019 | Borgmeyer |
| 10,255,922 | B1 | 4/2019 | Sharifi et al. |
| 10,277,581 | B2 | 4/2019 | Chandrasekharan et al. |
| 10,305,895 | B2 | 5/2019 | Barry et al. |
| 10,306,061 | B1* | 5/2019 | Sumner ................. H04M 3/493 |
| 10,318,580 | B2 | 6/2019 | Topchy et al. |
| 10,334,350 | B2 | 6/2019 | Petrank |
| 10,339,290 | B2 | 7/2019 | Valendi et al. |
| 10,460,095 | B2* | 10/2019 | Boesen ................. H04R 1/1016 |
| 10,467,509 | B2 | 11/2019 | Albadawi et al. |
| 10,733,987 | B1 | 8/2020 | Govender et al. |
| 10,915,614 | B2 | 2/2021 | Lesso |
| 11,017,252 | B2 | 5/2021 | Lesso |
| 11,023,755 | B2 | 6/2021 | Lesso |
| 2002/0169608 | A1 | 11/2002 | Tamir et al. |
| 2002/0194003 | A1 | 12/2002 | Mozer |
| 2003/0033145 | A1 | 2/2003 | Petrushin |
| 2003/0177006 | A1* | 9/2003 | Ichikawa ............ G10L 21/0216 704/231 |
| 2003/0177007 | A1 | 9/2003 | Kanazawa et al. |
| 2003/0182119 | A1 | 9/2003 | Junqua et al. |
| 2004/0030550 | A1 | 2/2004 | Liu |
| 2004/0141418 | A1 | 7/2004 | Matsuo et al. |
| 2004/0230432 | A1 | 11/2004 | Liu et al. |
| 2005/0060153 | A1 | 3/2005 | Gable et al. |
| 2005/0107130 | A1 | 5/2005 | Peterson, II |
| 2005/0171774 | A1 | 8/2005 | Applebaum et al. |
| 2006/0116874 | A1 | 6/2006 | Samuelsson et al. |
| 2006/0171571 | A1 | 8/2006 | Chan et al. |
| 2007/0055517 | A1 | 3/2007 | Spector |
| 2007/0129941 | A1 | 6/2007 | Tavares |
| 2007/0185718 | A1 | 8/2007 | Di Mambro et al. |
| 2007/0233483 | A1 | 10/2007 | Kuppuswamy et al. |
| 2007/0250920 | A1 | 10/2007 | Lindsay |
| 2007/0276658 | A1 | 11/2007 | Douglass |
| 2008/0040615 | A1 | 2/2008 | Carper et al. |
| 2008/0071532 | A1 | 3/2008 | Ramakrishnan et al. |
| 2008/0082510 | A1 | 4/2008 | Wang et al. |
| 2008/0223646 | A1 | 9/2008 | White |
| 2008/0262382 | A1 | 10/2008 | Akkermans et al. |
| 2008/0285813 | A1 | 11/2008 | Holm |
| 2009/0087003 | A1 | 4/2009 | Zurek et al. |
| 2009/0105548 | A1 | 4/2009 | Bart |
| 2009/0167307 | A1 | 7/2009 | Kopp |
| 2009/0232361 | A1 | 9/2009 | Miller |
| 2009/0281809 | A1 | 11/2009 | Reuss |
| 2009/0319270 | A1 | 12/2009 | Gross |
| 2010/0004934 | A1 | 1/2010 | Hirose et al. |
| 2010/0076770 | A1 | 3/2010 | Ramaswamy |
| 2010/0106502 | A1 | 4/2010 | Farrell et al. |
| 2010/0106503 | A1 | 4/2010 | Farrell et al. |
| 2010/0204991 | A1 | 8/2010 | Ramakrishnan et al. |
| 2010/0328033 | A1 | 12/2010 | Kamei |
| 2011/0051907 | A1 | 3/2011 | Jaiswal et al. |
| 2011/0075857 | A1 | 3/2011 | Aoyagi |
| 2011/0142268 | A1 | 6/2011 | Iwakuni et al. |
| 2011/0246198 | A1 | 10/2011 | Asenjo et al. |
| 2011/0276323 | A1 | 11/2011 | Seyfetdinov |
| 2011/0314530 | A1 | 12/2011 | Donaldson |
| 2011/0317848 | A1 | 12/2011 | Ivanov et al. |
| 2012/0110341 | A1 | 5/2012 | Beigi |
| 2012/0223130 | A1 | 9/2012 | Knopp et al. |
| 2012/0224456 | A1 | 9/2012 | Visser et al. |
| 2012/0249328 | A1 | 10/2012 | Xiong |
| 2012/0323796 | A1 | 12/2012 | Udani |
| 2013/0024191 | A1 | 1/2013 | Krutsch et al. |
| 2013/0058488 | A1 | 3/2013 | Cheng et al. |
| 2013/0080167 | A1 | 3/2013 | Mozer |
| 2013/0132091 | A1 | 5/2013 | Skerpac |
| 2013/0225128 | A1 | 8/2013 | Gomar |
| 2013/0227678 | A1 | 8/2013 | Kang |
| 2013/0247082 | A1 | 9/2013 | Wang et al. |
| 2013/0254845 | A1* | 9/2013 | Boesgaard Soerensen ................. G06F 21/55 726/3 |
| 2013/0279297 | A1 | 10/2013 | Wulff et al. |
| 2013/0279724 | A1 | 10/2013 | Stafford |
| 2013/0289999 | A1 | 10/2013 | Hymel |
| 2014/0059347 | A1 | 2/2014 | Dougherty et al. |
| 2014/0149117 | A1 | 5/2014 | Bakish et al. |
| 2014/0172430 | A1 | 6/2014 | Rutherford et al. |
| 2014/0188770 | A1 | 7/2014 | Agrafioli et al. |
| 2014/0237576 | A1 | 8/2014 | Zhang et al. |
| 2014/0241597 | A1 | 8/2014 | Leite |
| 2014/0293749 | A1 | 10/2014 | Gervaise |
| 2014/0307876 | A1 | 10/2014 | Agiomyrgiannakis et al. |
| 2014/0330568 | A1 | 11/2014 | Lewis et al. |
| 2014/0337945 | A1 | 11/2014 | Jia et al. |
| 2014/0343703 | A1 | 11/2014 | Topchy et al. |
| 2014/0358353 | A1 | 12/2014 | Ibanez-Guzman et al. |
| 2014/0358535 | A1 | 12/2014 | Lee et al. |
| 2015/0006163 | A1 | 1/2015 | Liu et al. |
| 2015/0028996 | A1 | 1/2015 | Agrafioti et al. |
| 2015/0033305 | A1 | 1/2015 | Shear et al. |
| 2015/0036462 | A1 | 2/2015 | Calvarese |
| 2015/0088509 | A1 | 3/2015 | Gimenez et al. |
| 2015/0089616 | A1 | 3/2015 | Brezinski et al. |
| 2015/0112682 | A1 | 4/2015 | Rodriguez et al. |
| 2015/0134330 | A1 | 5/2015 | Baldwin et al. |
| 2015/0161370 | A1 | 6/2015 | North et al. |
| 2015/0161459 | A1 | 6/2015 | Boczek |
| 2015/0168996 | A1* | 6/2015 | Sharpe ................. G06F 21/316 700/73 |
| 2015/0245154 | A1 | 8/2015 | Dadu et al. |
| 2015/0261944 | A1 | 9/2015 | Hosom et al. |
| 2015/0276254 | A1 | 10/2015 | Nemcek et al. |
| 2015/0301796 | A1 | 10/2015 | Visser et al. |
| 2015/0332665 | A1 | 11/2015 | Mishra et al. |
| 2015/0347734 | A1 | 12/2015 | Beigi |
| 2015/0356974 | A1 | 12/2015 | Tani et al. |
| 2015/0371639 | A1 | 12/2015 | Foerster et al. |
| 2016/0007118 | A1 | 1/2016 | Lee et al. |
| 2016/0026781 | A1 | 1/2016 | Boczek |
| 2016/0066113 | A1 | 3/2016 | Elkhatib et al. |
| 2016/0071516 | A1 | 3/2016 | Lee et al. |
| 2016/0086609 | A1 | 3/2016 | Yue et al. |
| 2016/0111112 | A1 | 4/2016 | Hayakawa |

(56) References Cited

U.S. PATENT DOCUMENTS

| | | |
|---|---|---|
| 2016/0125877 A1 | 5/2016 | Foerster et al. |
| 2016/0125879 A1 | 5/2016 | Lovitt |
| 2016/0147987 A1 | 5/2016 | Jang et al. |
| 2016/0148012 A1 | 5/2016 | Khitrov et al. |
| 2016/0210407 A1 | 7/2016 | Hwang et al. |
| 2016/0217321 A1 | 7/2016 | Gottlieb |
| 2016/0217795 A1 | 7/2016 | Lee et al. |
| 2016/0234204 A1 | 8/2016 | Rishi et al. |
| 2016/0248768 A1 | 8/2016 | McLaren et al. |
| 2016/0314790 A1 | 10/2016 | Tsujikawa et al. |
| 2016/0324478 A1 | 11/2016 | Goldstein |
| 2016/0330198 A1 | 11/2016 | Stern et al. |
| 2016/0371555 A1 | 12/2016 | Derakhshani |
| 2017/0011406 A1 | 1/2017 | Tunnell et al. |
| 2017/0049335 A1 | 2/2017 | Duddy |
| 2017/0068805 A1 | 3/2017 | Chandrasekharan et al. |
| 2017/0078780 A1 | 3/2017 | Qian et al. |
| 2017/0110117 A1 | 4/2017 | Chakladar et al. |
| 2017/0110121 A1 | 4/2017 | Warford et al. |
| 2017/0112671 A1 | 4/2017 | Goldstein |
| 2017/0116995 A1* | 4/2017 | Ady .................. G10L 17/24 |
| 2017/0134377 A1 | 5/2017 | Tokunaga et al. |
| 2017/0150254 A1 | 5/2017 | Bakish et al. |
| 2017/0161482 A1 | 6/2017 | Eltoft et al. |
| 2017/0169828 A1 | 6/2017 | Sachdev |
| 2017/0200451 A1 | 7/2017 | Bocklet et al. |
| 2017/0213268 A1 | 7/2017 | Puehse et al. |
| 2017/0214687 A1 | 7/2017 | Klein et al. |
| 2017/0231534 A1 | 8/2017 | Agassy et al. |
| 2017/0256270 A1 | 9/2017 | Singaraju et al. |
| 2017/0279815 A1 | 9/2017 | Chung et al. |
| 2017/0287490 A1 | 10/2017 | Biswal et al. |
| 2017/0323644 A1 | 11/2017 | Kawato |
| 2017/0347180 A1 | 11/2017 | Petrank |
| 2017/0347348 A1 | 11/2017 | Masaki et al. |
| 2017/0351487 A1 | 12/2017 | Vaquero et al. |
| 2018/0018974 A1 | 1/2018 | Zass |
| 2018/0032712 A1 | 2/2018 | Oh et al. |
| 2018/0039769 A1 | 2/2018 | Saunders et al. |
| 2018/0047393 A1 | 2/2018 | Tian et al. |
| 2018/0060552 A1 | 3/2018 | Pellom et al. |
| 2018/0060557 A1 | 3/2018 | Valenti et al. |
| 2018/0096120 A1 | 4/2018 | Boesen |
| 2018/0107866 A1 | 4/2018 | Li et al. |
| 2018/0108225 A1 | 4/2018 | Mappus et al. |
| 2018/0113673 A1 | 4/2018 | Sheynblat |
| 2018/0121161 A1 | 5/2018 | Ueno et al. |
| 2018/0146370 A1 | 5/2018 | Krishnaswamy et al. |
| 2018/0166071 A1 | 6/2018 | Lee et al. |
| 2018/0174600 A1 | 6/2018 | Chaudhuri et al. |
| 2018/0176215 A1 | 6/2018 | Perotti et al. |
| 2018/0187969 A1 | 7/2018 | Kim et al. |
| 2018/0191501 A1 | 7/2018 | Lindemann |
| 2018/0197525 A1 | 7/2018 | Kikuhara et al. |
| 2018/0232201 A1 | 8/2018 | Holtmann |
| 2018/0232511 A1 | 8/2018 | Bakish |
| 2018/0233142 A1 | 8/2018 | Koishida et al. |
| 2018/0239955 A1 | 8/2018 | Rodriguez et al. |
| 2018/0240463 A1 | 8/2018 | Perotti |
| 2018/0254046 A1 | 9/2018 | Khoury et al. |
| 2018/0289354 A1 | 10/2018 | Cvijanovic et al. |
| 2018/0292523 A1 | 10/2018 | Orenstein et al. |
| 2018/0308487 A1 | 10/2018 | Goel et al. |
| 2018/0324518 A1 | 11/2018 | Dusan et al. |
| 2018/0330727 A1 | 11/2018 | Tulli |
| 2018/0336716 A1 | 11/2018 | Ramprashad et al. |
| 2018/0336901 A1 | 11/2018 | Masaki et al. |
| 2018/0349585 A1 | 12/2018 | Ahn et al. |
| 2018/0352332 A1 | 12/2018 | Tao |
| 2018/0357470 A1 | 12/2018 | Yang et al. |
| 2018/0358020 A1 | 12/2018 | Chen et al. |
| 2018/0366124 A1 | 12/2018 | Cilingir et al. |
| 2018/0374487 A1 | 12/2018 | Lesso |
| 2018/0376234 A1 | 12/2018 | Petrank |
| 2019/0005963 A1 | 1/2019 | Alonso et al. |
| 2019/0005964 A1 | 1/2019 | Alonso et al. |
| 2019/0013033 A1 | 1/2019 | Bhimanaik et al. |
| 2019/0027152 A1 | 1/2019 | Huang et al. |
| 2019/0030452 A1 | 1/2019 | Fassbender et al. |
| 2019/0042871 A1 | 2/2019 | Pogorelik |
| 2019/0043512 A1 | 2/2019 | Huang et al. |
| 2019/0065478 A1 | 2/2019 | Tsujikawa et al. |
| 2019/0098003 A1 | 3/2019 | Ota |
| 2019/0114496 A1 | 4/2019 | Lesso |
| 2019/0114497 A1 | 4/2019 | Lesso |
| 2019/0115030 A1 | 4/2019 | Lesso |
| 2019/0115032 A1 | 4/2019 | Lesso |
| 2019/0115033 A1 | 4/2019 | Lesso |
| 2019/0115046 A1 | 4/2019 | Lesso |
| 2019/0122670 A1 | 4/2019 | Roberts et al. |
| 2019/0147888 A1 | 5/2019 | Lesso |
| 2019/0149920 A1 | 5/2019 | Putzeys et al. |
| 2019/0149932 A1 | 5/2019 | Lesso |
| 2019/0180014 A1 | 6/2019 | Kovvali et al. |
| 2019/0197755 A1 | 6/2019 | Vats |
| 2019/0199935 A1 | 6/2019 | Danielsen et al. |
| 2019/0228778 A1 | 7/2019 | Lesso |
| 2019/0228779 A1 | 7/2019 | Lesso |
| 2019/0246075 A1 | 8/2019 | Khadloya et al. |
| 2019/0260731 A1 | 8/2019 | Chandrasekharan et al. |
| 2019/0287536 A1 | 9/2019 | Sharifi et al. |
| 2019/0294629 A1 | 9/2019 | Wexler et al. |
| 2019/0295554 A1 | 9/2019 | Lesso |
| 2019/0304470 A1 | 10/2019 | Ghaeemaghami et al. |
| 2019/0306594 A1 | 10/2019 | Aumer et al. |
| 2019/0306613 A1 | 10/2019 | Qian et al. |
| 2019/0311722 A1 | 10/2019 | Caldwell |
| 2019/0313014 A1 | 10/2019 | Welbourne et al. |
| 2019/0318035 A1 | 10/2019 | Blanco et al. |
| 2019/0356588 A1 | 11/2019 | Shahraray et al. |
| 2019/0371330 A1 | 12/2019 | Lin et al. |
| 2019/0372969 A1 | 12/2019 | Chang et al. |
| 2019/0373438 A1 | 12/2019 | Amir et al. |
| 2019/0392145 A1 | 12/2019 | Komogortsev |
| 2019/0394195 A1 | 12/2019 | Chari et al. |
| 2020/0035247 A1 | 1/2020 | Boyadjiev et al. |
| 2020/0184057 A1 | 6/2020 | Mukund |
| 2020/0204937 A1 | 6/2020 | Lesso |
| 2020/0227071 A1 | 7/2020 | Lesso |
| 2020/0265834 A1 | 8/2020 | Lesso et al. |
| 2021/0304775 A1 | 9/2021 | van den Berg |
| 2022/0382846 A1 | 12/2022 | Koshinaka et al. |

FOREIGN PATENT DOCUMENTS

| | | |
|---|---|---|
| CN | 1937955 A | 3/2007 |
| CN | 101228787 A | 7/2008 |
| CN | 101578637 A | 11/2009 |
| CN | 102246228 A | 11/2011 |
| CN | 103109495 A | 5/2013 |
| CN | 103477604 A | 12/2013 |
| CN | 104038625 A | 9/2014 |
| CN | 104956715 A | 9/2015 |
| CN | 105185380 A | 12/2015 |
| CN | 105244031 A | 1/2016 |
| CN | 105702263 A | 6/2016 |
| CN | 105869630 A | 8/2016 |
| CN | 105913855 A | 8/2016 |
| CN | 105933272 A | 9/2016 |
| CN | 105938716 A | 9/2016 |
| CN | 106297772 A | 1/2017 |
| CN | 106531172 A | 3/2017 |
| CN | 106537889 A | 3/2017 |
| EP | 1205884 A2 | 5/2002 |
| EP | 1600791 A1 | 11/2005 |
| EP | 1701587 A1 | 9/2006 |
| EP | 1928213 A1 | 6/2008 |
| EP | 1965331 A2 | 9/2008 |
| EP | 2660813 A1 | 11/2013 |
| EP | 2704052 A2 | 3/2014 |
| EP | 2860706 A2 | 4/2015 |
| EP | 3016314 A1 | 5/2016 |
| EP | 3156978 A1 | 4/2017 |
| EP | 3466106 A1 | 4/2019 |

(56) References Cited

FOREIGN PATENT DOCUMENTS

| | | |
|---|---|---|
| GB | 2375205 A | 11/2002 |
| GB | 2493849 A | 2/2013 |
| GB | 2499781 A | 9/2013 |
| GB | 2515527 A | 12/2014 |
| GB | 2541466 A | 2/2017 |
| GB | 2551209 A | 12/2017 |
| GB | 2552723 A | 2/2018 |
| JP | 2003058190 A | 2/2003 |
| JP | 2006010809 A | 1/2006 |
| JP | 2010086328 A | 4/2010 |
| TW | 200820218 A | 5/2008 |
| WO | 9834216 A2 | 8/1998 |
| WO | 0208147 A1 | 10/2002 |
| WO | 02/103680 A2 | 12/2002 |
| WO | 2006054205 A1 | 5/2006 |
| WO | 2007034371 A1 | 3/2007 |
| WO | 2008113024 A1 | 9/2008 |
| WO | 2010066269 A1 | 6/2010 |
| WO | 2013022930 A1 | 2/2013 |
| WO | 2013154790 A1 | 10/2013 |
| WO | 2014040124 A1 | 3/2014 |
| WO | 2015117674 A1 | 8/2015 |
| WO | 2015163774 A1 | 10/2015 |
| WO | 2016003299 A1 | 1/2016 |
| WO | 2017055551 A | 4/2017 |
| WO | 2017203484 A1 | 11/2017 |
| WO | 2019008387 A1 | 1/2019 |
| WO | 2019008389 A1 | 1/2019 |
| WO | 2019008392 A1 | 1/2019 |
| WO | 2019145708 A1 | 8/2019 |

OTHER PUBLICATIONS

Beigi, Homayoon, "Fundamentals of Speaker Recognition," Chapters 8-10, ISBN: 978-0-378-77592-0; 2011.
Li, Lantian et al., "A Study on Replay Attack and Anti-Spoofing for Automatic Speaker Verification", Interspeech 2017, Jan. 1, 2017, pp. 92-96.
Li, Zhi et al., "Compensation of Hysteresis Nonlinearity in Magnetostrictive Actuators with Inverse Multiplicative Structure for Preisach Model", IEE Transactions on Automation Science and Engineering, vol. 11, No. 2, Apr. 1, 2014, pp. 613-619.
Partial International Search Report of the International Searching Authority, International Application No. PCT/GB2018/052905, dated Jan. 25, 2019.
Further Search Report under Sections 17 (6), UKIPO, Application No. GB1719731.0, dated Nov. 26, 2018.
Combined Search and Examination Report, UKIPO, Application No. GB1713695.3, dated Feb. 19, 2018.
Zhang et al., An Investigation of Deep-Learing Frameworks for Speaker Verification Antispoofing—IEEE Journal of Selected Topics in Signal Processes, Jun. 1, 2017.
Combined Search and Examination Report under Sections 17 and 18(3), UKIPO, Application No. GB1804843.9, dated Sep. 27, 2018.
Wu et al., Anti-Spoofing for text-Independent Speaker Verification: An Initial Database, Comparison of Countermeasures, and Human Performance, IEEE/ACM Transactions on Audio, Speech, and Language Processing, Issue Date: Apr. 2016.
Combined Search and Examination Report under Sections 17 and 18(3), UKIPO, Application No. GB1803570.9, dated Aug. 21, 2018.
Combined Search and Examination Report under Sections 17 and 18(3), UKIPO, Application No. GB1801661.8, dated Jul. 30, 2018.
Combined Search and Examination Report under Sections 17 and 18(3), UKIPO, Application No. GB1801663.4, dated Jul. 18, 2018.
Combined Search and Examination Report under Sections 17 and 18(3), UKIPO, Application No. GB1801684.2, dated Aug. 1, 2018.
Combined Search and Examination Report under Sections 17 and 18(3), UKIPO, Application No. GB1719731.0, dated May 16, 2018.
Combined Search and Examination Report, UKIPO, Application No. GB1801874.7, dated Jul. 25, 2018.
Combined Search and Examination Report under Sections 17 and 18(3), UKIPO, Application No. GB1801659.2, dated Jul. 26, 2018.
International Search Report and Written Opinion of the International Searching Authority, International Application No. PCT/GB2018/052906, dated Jan. 14, 2019.
International Search Report and Written Opinion of the International Searching Authority, International Application No. PCT/GB2019/050185, dated Apr. 2, 2019.
Combined Search and Examination Report under Sections 17 and 18(3), UKIPO, Application No. GB1809474.8, dated Jul. 23, 2018.
Ajmera, et al,, "Robust Speaker Change Detection," IEEE Signal Processing Letters, vol. 11, No. 8, pp. 649-651, Aug. 2004.
International Search Report and Written Opinion of the International Searching Authority, International Application No. PCT/GB2018/051760, dated Aug. 3, 2018.
International Search Report and Written Opinion of the International Searching Authority, International Application No. PCT/GB2018/051787, dated Aug. 16, 2018.
Villalba, Jesus et al., Preventing Replay Attacks on Speaker Verification Systems, International Carnahan Conference on Security Technology (ICCST), 2011 IEEE, Oct. 18, 2011, pp. 1-8.
International Search Report and Written Opinion of the International Searching Authority, International Application No. PCT/GB2018/051765, dated Aug. 16, 2018.
Combined Search and Examination Report under Sections 17 and 18(3), UKIPO, Application No. GB1713697.9, dated Feb. 20, 2018.
Chen et al., "You Can Hear But You Cannot Steal: Defending Against Voice Impersonation Attacks on Smartphones", Proceedings of the International Conference on Distributed Computing Systems, PD: Jun. 5, 2017.
International Search Report and Written Opinion of the International Searching Authority, International Application No. PCT/GB2018/052907, dated Jan. 15, 2019.
Combined Search and Examination Report under Sections 17 and 18(3), UKIPO, Application No. GB1713699.5, dated Feb. 21, 2018.
Lim, Zhi Hao et al., An Investigation of Spectral Feature Partitioning for Replay Attacks Detection, Proceedings of APSIPA Annual Summit and Conference 2017, Dec. 12-15, 2017, Malaysia, pp. 1570-1573.
International Search Report and Written Opinion of the International Searching Authority, International Application No. PCT/GB2019/052302, dated Oct. 2, 2019.
Liu, Yuan et al., "Speaker verification with deep features", Jul. 2014, in International Joint Conference on Neural Networks (IJCNN), pp. 747-753, IEEE.
International Search Report and Written Opinion of the International Searching Authority, International Application No. PCT/GB2018/051927, dated Sep. 25, 2018.
Combined Search and Examination Report under Sections 17 and 18(3), UKIPO, Application No. 1801530.5, dated Jul. 25, 2018.
International Search Report and Written Opinion of the International Searching Authority, International Application No. PCT/GB2018/051924, dated Sep. 26, 2018.
Combined Search and Examination Report under Sections 17 and 18(3), UKIPO, Application No. 1801526.3, dated Jul. 25, 2018.
International Search Report and Written Opinion of the International Searching Authority, International Application No. PCT/GB2019/051928, dated Dec. 3, 2019.
Combined Search and Examination Report under Sections 17 and 18(3), UKIPO, Application No. 1801532.1, dated Jul. 25, 2018.
International Search Report and Written Opinion of the International Searching Authority, International Application No. PCT/GB2019/052143, dated Sep. 17, 2019.
International Search Report and Written Opinion of the International Searching Authority, International Application No. PCT/GB2018/051931, dated Sep. 27, 2018.
International Search Report and Written Opinion of the International Searching Authority, International Application No. PCT/GB2018/051925, dated Sep. 26, 2018.
Combined Search and Examination Report under Sections 17 and 18(3), UKIPO, Application No. 1801528.9, dated Jul. 25, 2018.
Combined Search and Examination Report under Sections 17 and 18(3), UKIPO, Application No. 1801527.1, dated Jul. 25, 2018.

(56) References Cited

OTHER PUBLICATIONS

Lucas, Jim, What is Electromagnetic Radiation?, Mar. 13, 2015, Live Science, https://www.livescience.com/38169-electromagnetism.html, pp. 1-11 (Year: 2015).
Brownless, Jason, A Gentle Introduction to Autocorrelation and Partial Autocorrelation, Feb. 6, 2017, https://machinelearningmastery.com/gentle-introduction-autocorrelation-partial-autocorrelation/, accessed Apr. 28, 2020.
Ohtsuka, Takahiro and Kasuya, Hideki, Robust ARX Speech Analysis Method Taking Voice Source Pulse Train Into Account, Journal of the Acoustical Society of Japan, 58, 7, pp. 386-397, 2002.
Wikipedia, Voice (phonetics), https://en.wikipedia.org/wiki/Voice_(phonetics), accessed Jun. 1, 2020.
Zhang et al., DolphinAttack: Inaudible Voice Commands, Retrieved from Proceedings of the 2017 ACM SIGSAC Conference on Computer and Communications Security, Aug. 2017.
Song, Liwei, and Prateek Mittal, Poster: Inaudible Voice Commands, Proceedings of the 2017 ACM SIGSAC Conference on Computer and Communications Security, Aug. 2017.
Fortuna, Andrea, [Online], DolphinAttack: inaudiable voice commands allow attackers to control Siri, Alexa and other digital assistants, Sep. 2017.
First Office Action, China National Intellectual Property Administration, Patent Application No. 2018800418983, dated May 29, 2020.
International Search Report and Written Opinion, International Application No. PCT/GB2020/050723, dated Jun. 16, 2020.
Liu, Yuxi et al., "Earprint: Transient Evoked Otoacoustic Emission for Biometrics", IEEE Transactions on Information Forensics and Security, IEEE, Piscataway, NJ, US, vol. 9, No. 12, Dec. 1, 2014, pp. 2291-2301.
Seha, Sherif Nagib Abbas et al., "Human recognition using transient auditory evoked potentials: a preliminary study", IET Biometrics, IEEE, Michael Faraday House, Six Hills Way, Stevenage, Herts., UK, vol. 7, No. 3, May 1, 2018, pp. 242-250.
Liu, Yuxi et al., "Biometric identification based on Transient Evoked Otoacoustic Emission", IEEE International Symposium on Signal Processing and Information Technology, IEEE, Dec. 12, 2013, pp. 267-271.
Toth, Arthur R., et al., Synthesizing Speech from Doppler Signals, ICASSP 2010, IEEE, pp. 4638-4641.
Boesen, U.S. Appl. No. 62/403,045, filed Sep. 30, 2017.
First Office Action, China National Intellectual Property Administration, Application No. 2018800720846, dated Mar. 1, 2021.
Boesen, U.S. Appl. No. 62/403,045, Earpiece with Biometric Identifiers, filed Sep. 30, 2016.
Zhang, L. et al., Hearing Your Voice is Not Enough: An Articulatory Gesture Based Liveness Detection for Voice Authentication, CCS '17: Proceedings of the 2017 ACM SIGSAC Conference on Computer and Communications Security, Oct. 2017 pp. 57-71.
Meng, Y. et al., "Liveness Detection for Voice User Interface via Wireless Signals in IoT Environment," in IEEE Transactions on Dependable and Secure Computing, doi: 10.1109/TDSC.2020.2973620.
Wu, Libing, et al., LVID: A Multimodal Biometricas Authentication System on Smartphones, IEEE Transactions on Information Forensics and Security, Vo. 15, 2020, pp. 1572-1585.
Wang, Qian, et al., VoicePop: A Pop Noise based Anti-spoofing System for Voice Authentication on Smartphones, IEEE Infocom 2019—IEEE Conference on Computer Communications, Apr. 29-May 2, 2019, pp. 2062-2070.
Examination Report under Section 18(3), UKIPO, Application No. GB1918956.2, dated Jul. 29, 2021.
Examination Report under Section 18(3), UKIPO, Application No. GB1918965.3, dated Aug. 2, 2021.
Combined Search and Examination Report under Sections 17 and 18(3), UKIPO, Application No. GB2210986.2, dated Nov. 15, 2022.
Combined Search and Examination Report under Sections 17 and 18(3), UKIPO, Application No. GB2114337.5, dated Nov. 3, 2021.
Combined Search and Examination Report under Sections 17 and 18(3), UKIPO, Application No. GB2112228.8, dated May 17, 2022.
Search Report under Section 17, UKIPO, Application No. GB2202521.7, dated Jun. 21, 2022.
Search Report, China National Intellectual Property Administration, Application No. 201800658351, dated Feb. 2, 2023.
First Office Action, China National Intellectual Property Administration, Application No. 201800658351, dated Feb. 4, 2023.
First Office Action, China National Intellectual Property Administration, Patent Application No. 2018800452077, dated Feb. 25, 2023.
First Office Action, China National Intellectual Property Administration, Patent Application No. 2018800452787, dated Mar. 14, 2023.
First Office Action, China National Intellectual Property Administration, Patent Application No. 2018800419187, dated Feb. 28, 2023.
Notice of Preliminary Rejection, Korean Intellectual Property Office, Patent Application No. 10-2020-7002065, dated Apr. 17, 2023.
Notice of Preliminary Rejection, Korean Intellectual Property Office, Patent Application No. 10-2020-7002061, dated Apr. 27, 2023.
Wu et al., A study on replay attack and anti-spoofing for text-dependent speaker verification, Signal and Information Processing Association Annual Summit and Conference (APSIPA), 2014 Asia-Pacific, Dec. 9-12, 2014, IEEE.

\* cited by examiner

METHODS, APPARATUS AND SYSTEMS FOR AUTHENTICATION

TECHNICAL FIELD

Embodiments of the disclosure relate to methods, apparatus and systems for authentication of a user, and particularly to methods, apparatus and systems for authentication of a user based on biometric data.

BACKGROUND

Voice biometric systems are becoming prevalent in the art for authenticating users based on a spoken word, or phrase. Such systems usually implement at least two processes: biometric enrolment and biometric authentication. Enrolment comprises the acquisition and storage of biometric data which is characteristic of an individual. In the context of voice biometric systems, such stored data may be known as a "voice print". Authentication comprises the acquisition of biometric data from an individual, and the comparison of that data to the stored voice prints of one or more enrolled or authorised users. A positive comparison (i.e. a determination that the acquired data matches or is sufficiently close to a stored voice print) results in the individual being authenticated. For example, the individual may be permitted to carry out a restricted action, or granted access to a restricted area or device. A negative comparison (i.e. a determination that the acquired data does not match or is not sufficiently close to a stored voice print) results in the individual not being authenticated. For example, the individual may not be permitted to carry out the restricted action, or granted access to the restricted area or device.

One problem faced by biometric algorithms is the need to achieve acceptable performance in two respects. First, the algorithm should provide acceptable security so that unauthorised users are not falsely recognized as authorised users. The likelihood that the algorithm will reject an access attempt by an authorised user is known as the false acceptance rate (FAR), and should be kept low if the algorithm is to provide reasonable security. Second, the algorithm should work reliably, so that authorised users are not falsely rejected as unauthorised. The likelihood that the algorithm will reject an access attempt by an authorised user is known as the false rejection rate (FRR), and should also be kept low if the algorithm is not to prove frustrating for authorised users seeking authentication.

The problem is that these two performance requirements conflict with each other. A low FRR can be achieved by relaxing the requirements for a user to achieve authentication. However, this will also have the consequence of increasing the FAR. Conversely, a low FAR can be achieved by making the requirements for a user to achieve authentication stricter. However, this will have the consequence of increasing the FRR.

One way to decrease both FAR and FRR is to increase the efficacy of the biometric algorithm itself. However, designing the algorithm to achieve high performance is difficult. Further, the efficacy may depend on factors which are outside the designers' control. For example, the efficacy of the algorithm may depend on the quality of the biometric data. However, the user may be in a noisy environment such that poor data quality in the recorded voice signal is unavoidable.

SUMMARY

Embodiments of the present disclosure seek to address one or more of these problems by providing voice biometric authentication based on an audio signal comprising a representation of a voice signal of a user conducted via at least part of the user's skeleton. Such a voice signal may be called a "bone-conducted" voice signal herein.

It is known that, as the user speaks, sound is projected away from the user's mouth through the air. However, acoustic vibrations will also be carried through part of the user's skeleton or skull, such as the jaw bone. These acoustic vibrations may be coupled to the ear canal through the jaw or some other part of the user's skeleton or skull. The phenomenon explains how a person is able to hear him- or herself speak, even when wearing ear plugs, for example. The acoustic vibrations from the user's voice are carried through part of the user's skeleton to the ear canal, where they are coupled to the ear drum and detected as speech.

Embodiments of the present invention utilize this phenomenon to perform biometric authentication. For example, a personal audio device placed in or adjacent to the user's ear may be able to detect the bone-conducted voice signal, allowing the signal to be used for biometric authentication.

Bone-conducted speech may be a more effective biometric discriminator than air-conducted speech, particularly in noisy environments. For example, microphones which are positioned to detect air-conducted speech (i.e. external to the user's ear) will typically also detect noise in the user's environment, degrading the quality of the air-conducted signal. However, the environmental noise may be coupled less strongly to the user's ear canal. For example, a personal audio device positioned to detect the bone-conducted voice signal may inherently mitigate some of the noise from being coupled to the user's ear canal through the physical barrier provided by the personal audio device. Further, the personal audio device may implement active noise cancellation (the microphone positioned to detect the bone-conducted voice signal may even form part of such an active noise cancellation system, for example, as an error microphone), and so actively reduce the noise in the ear canal, and hence the detected bone-conducted voice signal.

Thus, bone-conducted speech may be a more effective biometric discriminator than air-conducted speech, particularly in certain environmental conditions.

That said, the acoustic transfer function of bone is not ideal. For example, whereas the acoustic transfer function of air is substantially flat, the acoustic transfer function of bone is not flat. Lower-frequency acoustic signals tend to be transferred in preference to higher-frequency acoustic signals. Thus voiced speech (i.e. that speech or those phonemes generated while the vocal cords are vibrating) is coupled more strongly via bone conduction than unvoiced speech (i.e. that speech or those phonemes generated while the vocal cords are not vibrating).

The efficacy of the algorithm may further depend on the discriminatory nature of the biometric itself. For example, a biometric algorithm which discriminates between users based solely on gender will only ever achieve a 50% FAR and a 50% FRR at best. Bone-conducted speech, owing to the loss of high-frequency data, may be more limited than air-conducted speech in its ability to discriminate between users.

The efficacy of the authentication process overall may be improved by combining the bone-conducted voice biometric authentication process with one or more further authentication processes (whether biometric or not). Each authentication process may be associated with particular FAR and FRR values; however, the FAR and FRR for the combination of multiple authentication processes may be significantly lower.

For example, let us assume that a first authentication process has a FAR of 10%; one in ten users will be accepted by the first authentication process (i.e. identified as an authorised user). Now let us assume that the user is required to pass a second authentication process, which also has a FAR of 10%, in addition to the first authentication process. Although one in ten users will be accepted by the second authentication process, the overall FAR (i.e. based on the combination of the first and second authentication processes) will in fact be 1%. Therefore the overall authentication process is markedly improved without having to improve either the first or second authentication process individually.

In one example, the bone-conducted voice biometric authentication process is combined with an air-conducted voice biometric authentication process. The weighting of the combination may depend on one or more environmental conditions, such as noise. For example, in a noisy environment, the bone-conducted voice authentication algorithm may be given a relatively high weighting; in a less noisy environment, the bone-conducted voice authentication algorithm may be given a lower weighting.

Similarly, in a noisy environment, the air-conducted voice authentication algorithm may be given a relatively low weighting; in a less noisy environment, the air-conducted voice authentication algorithm may be given a higher weighting.

One aspect of the disclosure provides a method of biometric authentication. The method comprises: obtaining an audio signal comprising a representation of a voice signal of a user conducted via at least part of the user's skeleton; and performing a biometric authentication algorithm on the audio signal to authenticate the user.

Another aspect provides an apparatus for performing one or more biometric processes. The apparatus comprises: an input for obtaining an audio signal comprising a representation of a voice signal of a user conducted via at least part of the user's skeleton; and a biometric module for performing a biometric authentication algorithm on the audio signal to authenticate the user.

A further aspect of the disclosure provides an electronic apparatus comprising processing circuitry and a non-transitory machine-readable medium storing instructions which, when executed by the processing circuitry, cause the electronic apparatus to: obtain an audio signal comprising a representation of a voice signal of a user conducted via at least part of the user's skeleton; and perform a biometric authentication algorithm on the audio signal to authenticate the user.

Another aspect of the disclosure provides a non-transitory machine-readable medium storing instructions which, when executed by processing circuitry, cause an electronic apparatus to: obtain an audio signal comprising a representation of a voice signal of a user conducted via at least part of the user's skeleton; and perform a biometric authentication algorithm on the audio signal to authenticate the user.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Embodiments of the present disclosure relate to the acquisition and use of a bone-conducted voice signal. The bone-conducted voice signal may be acquired by a personal audio device. As used herein, the term "personal audio device" is any electronic device which is suitable for, or configurable to, provide audio playback substantially to only a single user. Some examples of suitable personal audio devices are shown in FIGS. 1a to 1f.

Figure 1A:
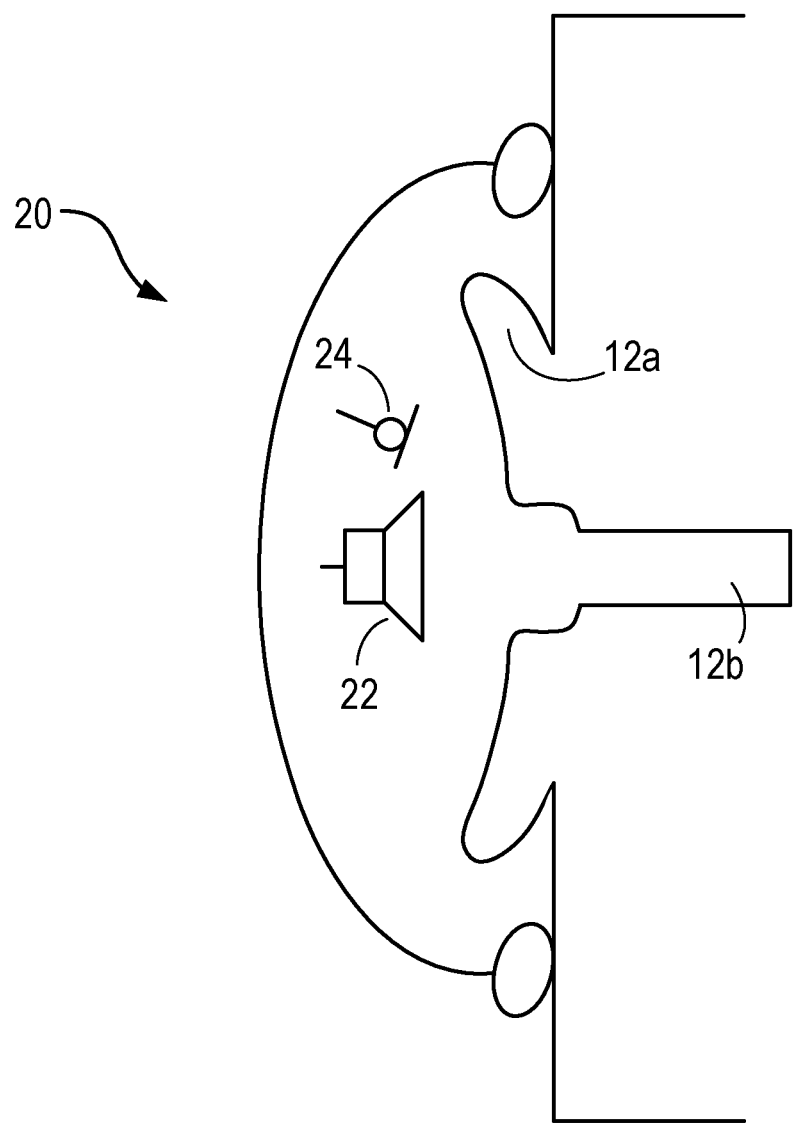
FIGS. 1a to 1e show examples of personal audio devices.

FIG. 1a shows a schematic diagram of a user's ear, comprising the (external) pinna or auricle 12a, and the (internal) ear canal 12b. A personal audio device 20 comprising a circum-aural headphone is worn by the user over the ear. The headphone comprises a shell which substantially surrounds and encloses the auricle 12a, so as to provide a physical barrier between the user's ear and the external environment. Cushioning or padding may be provided at an edge of the shell, so as to increase the comfort of the user, and also the acoustic coupling between the headphone and the user's skin (i.e. to provide a more effective barrier between the external environment and the user's ear).

The headphone comprises one or more loudspeakers 22 positioned on an internal surface of the headphone, and arranged to generate acoustic signals towards the user's ear and particularly the ear canal 12b. The headphone further comprises one or more microphones 24, also positioned on the internal surface of the headphone, arranged to detect acoustic signals within the internal volume defined by the headphone, the auricle 12a and the ear canal 12b. These microphones 24 may be operable to detect bone-conducted voice signals.

The headphone may be able to perform active noise cancellation, to reduce the amount of noise experienced by the user of the headphone. Active noise cancellation operates by detecting the noise (i.e. with a microphone), and generating a signal (i.e. with the loudspeaker) that has the same amplitude as the noise signal but is opposite in phase. The generated signal thus interferes destructively with the noise and so lessens the noise experienced by the user. Active noise cancellation may operate on the basis of feedback signals, feedforward signals, or a combination of both. Feedforward active noise cancellation utilizes one or more microphones on an external surface of the headphone, operative to detect the environmental noise before it reaches the user's ear. The detected noise is processed quickly, and the cancellation signal generated so as to match the incoming noise as it arrives at the user's ear. Feedback active noise cancellation utilizes one or more error microphones positioned on the internal surface of the headphone, operative to detect the combination of the noise and the audio playback signal generated by the one or more loudspeakers. This combination is used in a feedback loop, together with knowledge of the audio playback signal, to adjust the cancelling signal generated by the loudspeaker and so reduce the noise. The microphone 24 shown in FIG. 1a may therefore form part of an active noise cancellation system, for example, as an error microphone.

Figure 1B:
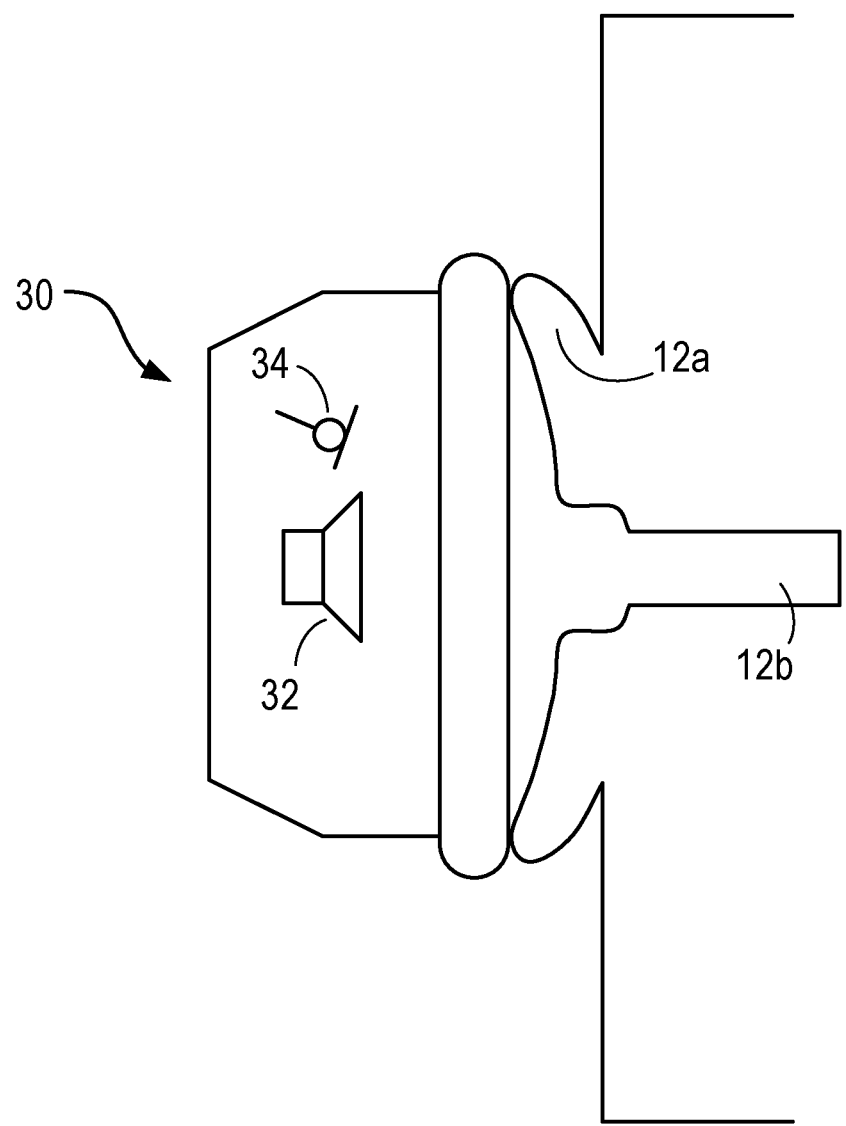

FIG. 1b shows an alternative personal audio device 30, comprising a supra-aural headphone. The supra-aural headphone does not surround or enclose the user's ear, but rather sits on the auricle 12a. The headphone may comprise a cushion or padding to lessen the impact of environmental noise. As with the circum-aural headphone shown in FIG. 1a, the supra-aural headphone comprises one or more loudspeakers 32 and one or more microphones 34. The loudspeaker(s) 32 and the microphone(s) 34 may form part of an active noise cancellation system, with the microphone 34 serving as an error microphone.

Figure 1C:
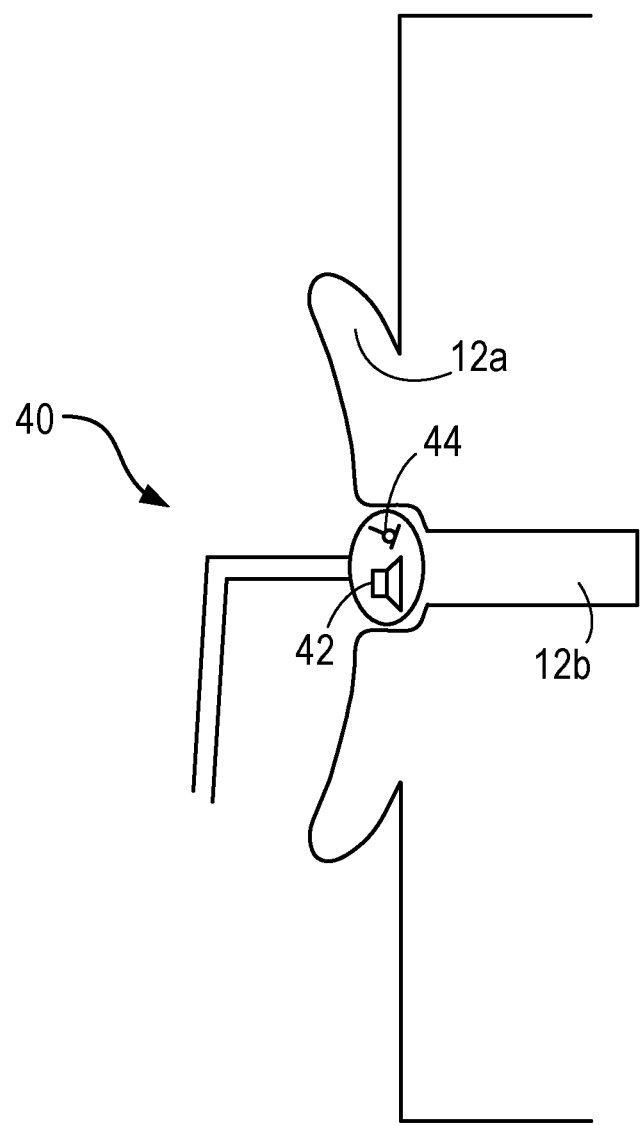

FIG. 1c shows a further alternative personal audio device 40, comprising an intra-concha headphone (or earphone). In use, the intra-concha headphone sits inside the user's concha cavity. The intra-concha headphone may fit loosely within the cavity, allowing the flow of air into and out of the user's ear canal 12b.

As with the devices shown in FIGS. 1a and 1b, the intra-concha headphone comprises one or more loudspeakers 42 and one or more microphones 44, which may form part of an active noise cancellation system.

Figure 1D:
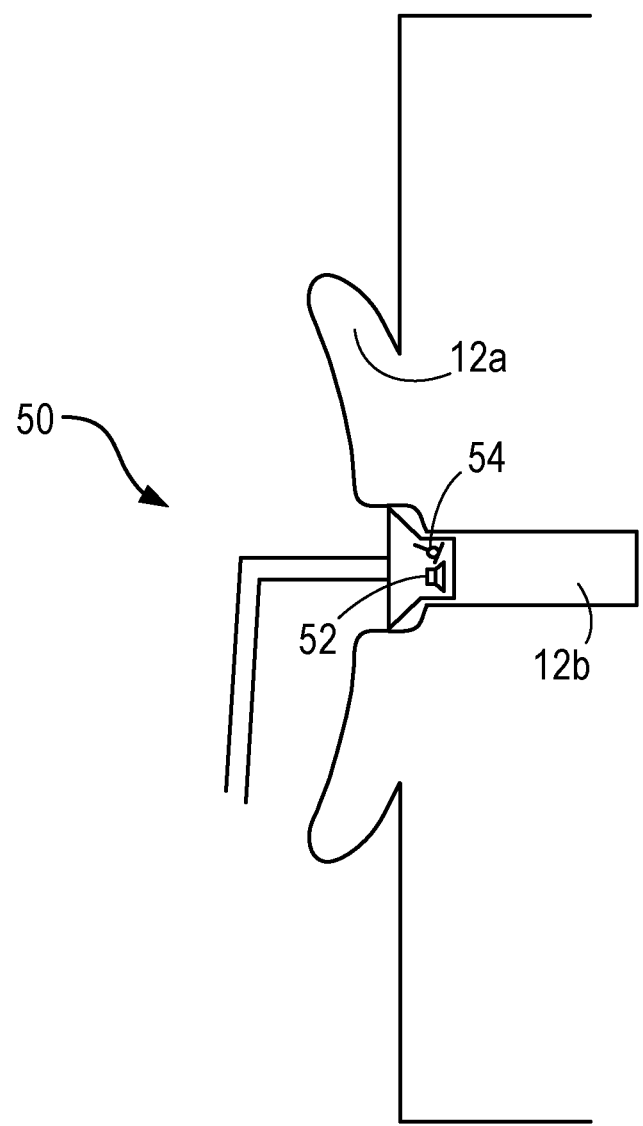

FIG. 1d shows a further alternative personal audio device 50, comprising an in-ear headphone (or earphone), insert headphone, or ear bud. This headphone is configured to be partially or totally inserted within the ear canal 12b, and may provide a relatively tight seal between the ear canal 12b and the external environment (i.e. it may be acoustically closed or sealed). The headphone may comprise one or more loudspeakers 52 and one or more microphones 54, as with the other devices described above, and these components may form part of an active noise cancellation system.

As the in-ear headphone may provide a relatively tight acoustic seal around the ear canal 12b, external noise (i.e. coming from the environment outside) detected by the microphone 54 is likely to be low.

Figure 1E:
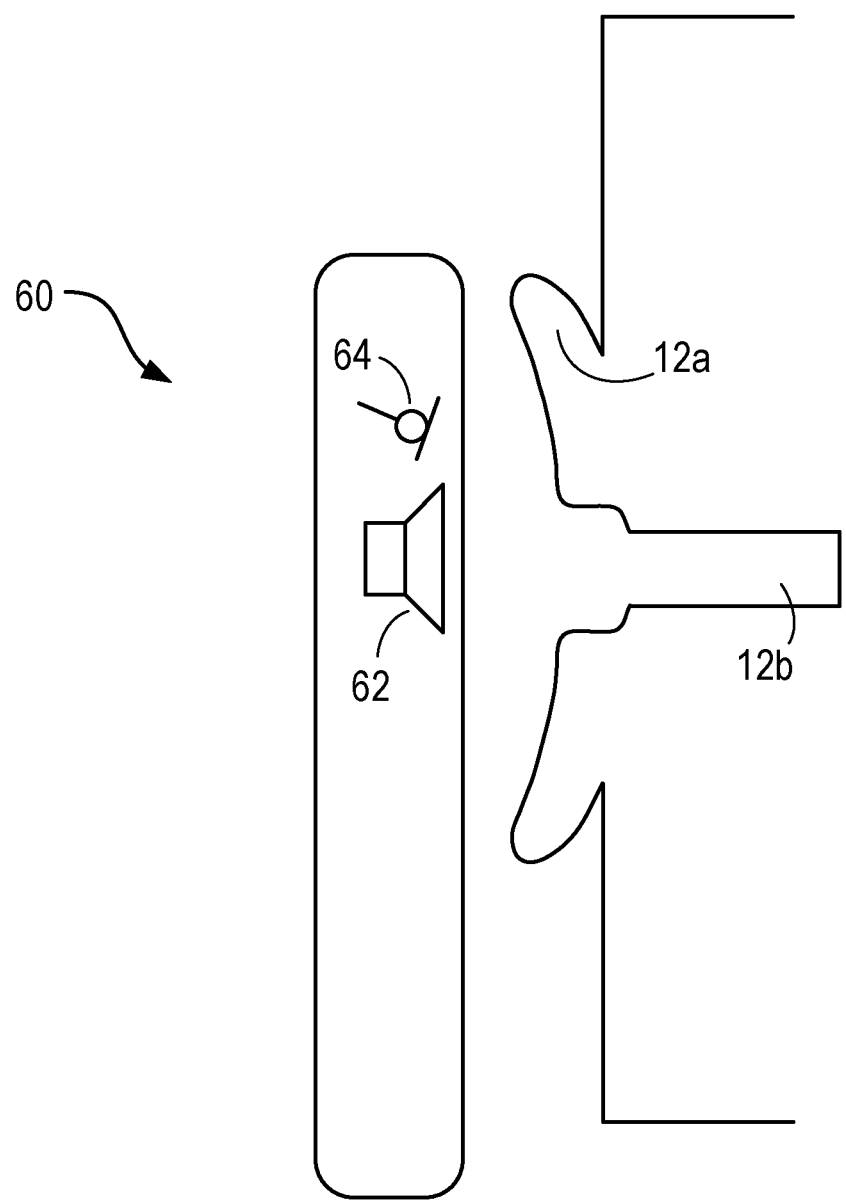

FIG. 1e shows a further alternative personal audio device 60, which is a mobile or cellular phone or handset. The handset 60 comprises one or more loudspeakers 62 for audio playback to the user, and one or more microphones 64 which are similarly positioned.

In use, the handset 60 is held close to the user's ear so as to provide audio playback (e.g. during a call). While a tight acoustic seal is not achieved between the handset 60 and the user's ear, the handset 60 is typically held close enough that an acoustic stimulus applied to the ear via the one or more loudspeakers 62 generates a response from the ear which can be detected by the one or more microphones 64. The one or more microphones 64 may also be able to detect bone-conducted voice signals. As with the other devices, the loudspeaker(s) 62 and microphone(s) 64 may form part of an active noise cancellation system.

All of the personal audio devices described above thus provide audio playback to substantially a single user in use. Each device is further operable to detect bone-conducted voice signals through the respective microphones 24, 34, 44, 54 and 64.

Some embodiments may utilize ear biometric authentication in addition to voice biometric authentication.

It is known that the acoustic properties of a user's ear, whether the outer parts (known as the pinna or auricle 12a), the ear canal 12b or both, differ substantially between individuals and can therefore be used as a biometric to identify the user. One or more loudspeakers or similar transducers positioned close to or within the ear generate an acoustic stimulus, and one or more microphones similarly positioned close to or within the ear detect the acoustic response of the ear to the acoustic stimulus. One or more features may be extracted from the response signal, and used to characterize an individual.

For example, the ear canal 12b is a resonant system, and therefore one feature which may be extracted from the response signal is the resonant frequency of the ear canal 12b. If the measured resonant frequency (i.e. in the response signal) differs from a stored resonant frequency for the user, a biometric algorithm coupled to receive and analyse the response signal may return a negative result. Other features of the response signal may be similarly extracted and used to characterize the individual. For example, the features may comprise one or more mel frequency cepstrum coefficients. More generally, the transfer function between the acoustic stimulus and the measured response signal (or features of the transfer function) may be determined, and compared to a stored transfer function (or stored features of the transfer function) which is characteristic of the user.

The acoustic stimulus may be generated and the response measured using any of the personal audio devices described above, i.e. using the respective loudspeakers (or other audio transducer) 22, 32, 42, 52, 62 and the respective microphones 24, 34, 44, 54, 64.

The loudspeaker is operable to generate an acoustic stimulus, or acoustic probing wave, towards the user's ear, and the microphone is operable to detect and measure a response of the user's ear to the acoustic stimulus, e.g. to measure acoustic waves reflected from the ear canal or the pinna. The acoustic stimulus may be sonic (for example in the audio frequency range of say 20 Hz to 20 kHz) or ultra-sonic (for example greater than 20 kHz or in the range 20 kHz to 50 kHz) or near-ultrasonic (for example in the range 15 kHz to 25 kHz) in frequency.

Another biometric marker may comprise otoacoustic noises emitted by the cochlear in response to the acoustic stimulus waveform. The otoacoustic response may comprise a mix of the frequencies in the input waveform. For example if the input acoustic stimulus consists of two tones at frequencies f1 and f2, the otoacoustic emission may include a component at frequency 2*f1−f2. The relative power of frequency components of the emitted waveform has been shown to be a useful biometric indicator. In some examples therefore the acoustic stimulus may comprise tones of two or more frequencies and the amplitude of mixing products at sums or differences of integer-multiple frequencies generated by otoacoustic emissions from the cochlear may be measured. Alternatively, otoacoustic emissions may be stimulated and measured by using stimulus waveforms comprising fast transients, e.g. clicks.

Depending on the construction and usage of the personal audio device, the measured response may comprise user-specific components, i.e. biometric data, relating to the auricle 12a, the ear canal 12b, or a combination of both the auricle 12a and the ear canal 12b. For example, the circum-aural headphones shown in FIG. 1a will generally acquire data relating to the auricle 12a and potentially also the ear canal 12b. The insert headphones shown in FIG. 1d will generally acquire data relating only to the ear canal 12b.

Figure 1F:
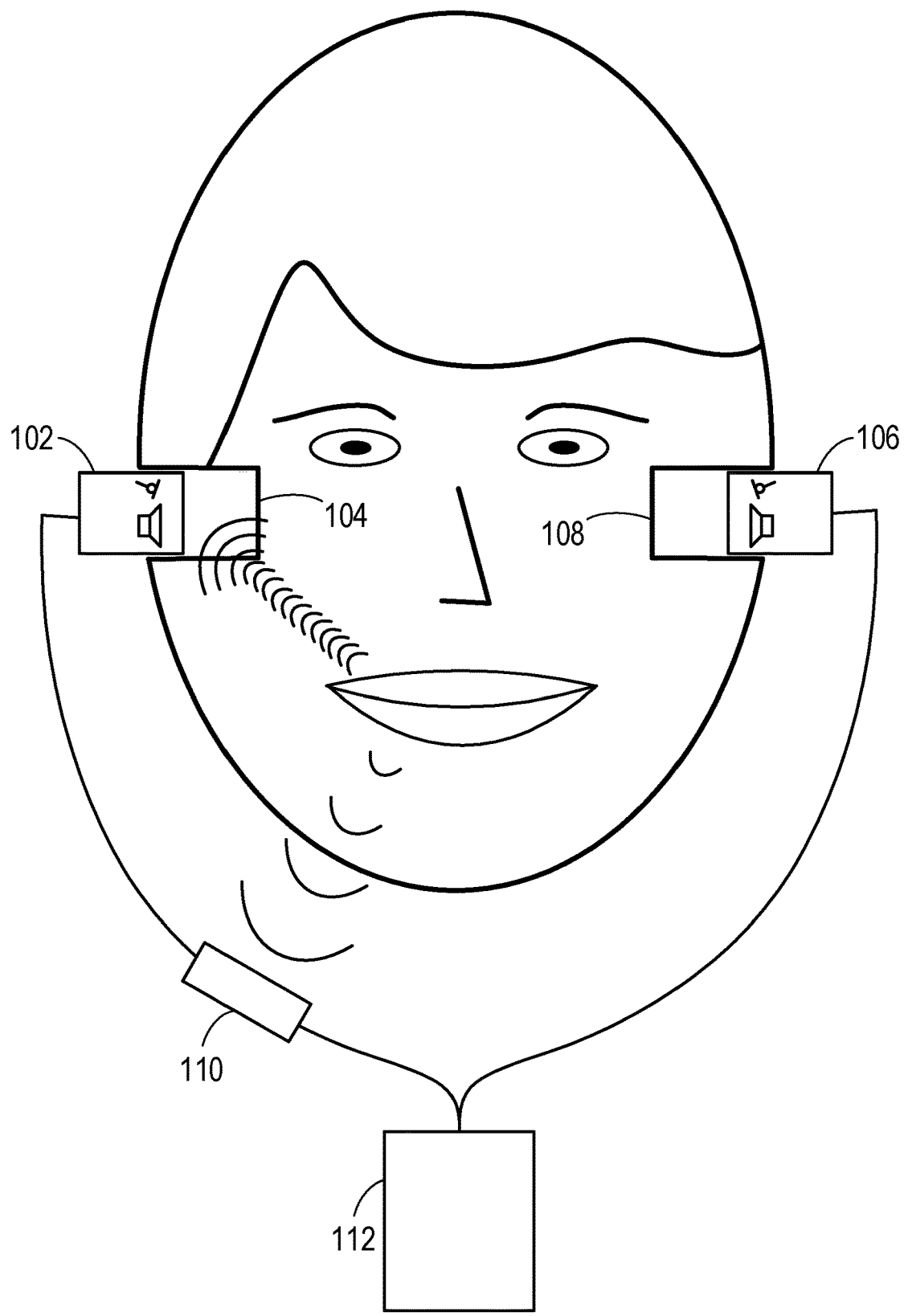
FIG. 1f shows use of a personal audio device by a user.

FIG. 1f shows the application of a personal audio device (in this case having a similar construction to personal audio device 50) to a user. The user has two ear canals 104, 108. A first in-ear headphone 102 (comprising a first loudspeaker or other audio transducer, and a first microphone or other transducer) is inserted into the first ear canal 104, while a second in-ear headphone 106 (comprising a second loudspeaker or other audio transducer, and a second microphone) is inserted into the second ear canal 108.

A voice microphone 110 is also provided which is positioned externally to the ear. In the illustrated embodiment, the voice microphone 110 is coupled to the first and second headphones 102, 106 via a wired connection. However, the voice microphone 110 may be positioned anywhere that is suitable to detect the voice of the user as conducted through the air, e.g. on an external surface of one or more of the headphones 102, 106. The voice microphones 110 may be coupled to the first and second headphones 102, 106 via a wireless connection. The headphones 102, 106 and voice microphone 110 are further coupled to a host electronic device 112. The host electronic device 112 may be a smartphone or other cellular or mobile phone, a media player, etc. In some embodiments, processing may be carried out within one of the headphones 102, 106, such that the host electronic device 112 is unnecessary. It will be further noted that, although FIG. 1f shows two headphones 102, 106, only a single headphone may be provided in some embodiments, or signals from a single one of the two headphones 102, 106 may be used for the processing described below.

As the user speaks, his or her voice is carried through the air to the voice microphone 110 where it is detected. In addition, the voice signal is carried through part of the user's skeleton or skull, such as the jaw bone, and coupled to the ear canal. The microphones in the headphones 102, 106 thus detect a bone-conducted voice signal.

It will be understood by those skilled in the art that the microphones or other transducers (such as accelerometers) detecting the bone-conducted signal may be the same as microphones or other transducers able to detect an acoustic response signal to an acoustic stimulus (i.e. for ear biometrics) and/or the same as microphones or other transducers provided as part of an active noise cancellation system (e.g. to detect an error signal). Alternatively, separate microphones or transducers may be provided for these individual purposes (or combinations of purposes) in the personal audio devices described above.

All of the devices shown in FIGS. 1a to 1f and described above may be used to implement aspects of the disclosure.

Embodiments of the disclosure provide voice biometric authentication based on the audio signal(s) detected in one or both of the headphones 102, 106, i.e. comprising a representation of a voice signal of a user conducted via at least part of the user's skeleton. Further embodiments of the disclosure may combine the bone-conducted audio signal, or the bone-conducted voice biometric process, with the signal detected in the voice microphone 110, i.e. an air-conducted voice signal, or an air-conducted voice biometric process. Still further embodiments of the disclosure may combine the bone-conducted voice biometric process with an ear biometric authentication process.

Figure 2:
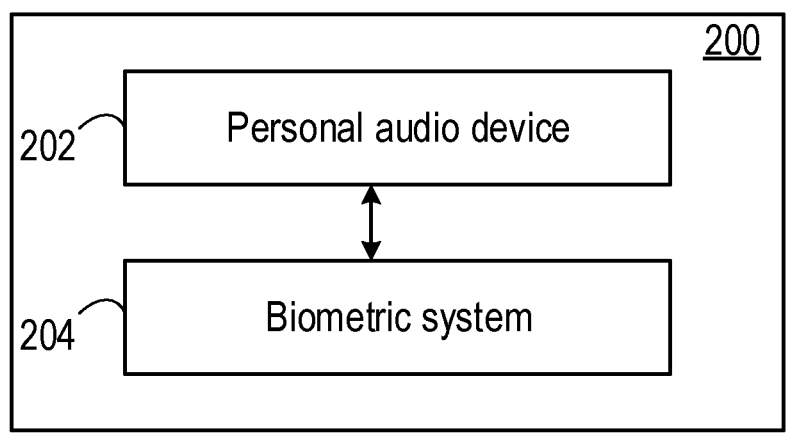
FIG. 2 shows an arrangement according to embodiments of the disclosure.

FIG. 2 shows an arrangement 200 according to embodiments of the disclosure. The arrangement 200 comprises a personal audio device 202 and a biometric system 204. The personal audio device 202 may be any device which is suitable for, or configured to provide audio playback to substantially a single user. The personal audio device 202 generally comprises one or more loudspeakers, and one or more microphones which, in use, are positioned adjacent to or within a user's ear. The personal audio device may be wearable, and comprise headphones for each of the user's ears. Alternatively, the personal audio device may be operable to be carried by the user, and held adjacent to the user's ear or ears during use. The personal audio device may comprise headphones or a mobile phone handset, as described above with respect to any of FIGS. 1a to 1f.

The biometric system 204 is coupled to the personal audio device 202 and thus receives biometric data which is indicative of the individual using the personal audio device. In some embodiments, the biometric system 204 may be operable to control the personal audio device 202 to acquire the biometric data.

For example, the personal audio device 202 may acquire bone-conducted voice signals and output the signals to the biometric system 204 for processing. For example, the personal audio device 202 may acquire air-conducted voice signals and output the signals to the biometric system 204 for processing. For example, the personal audio device 202 may acquire ear biometric data and output the signals to the biometric system 204 for processing.

When acquiring the ear biometric data, the personal audio device 202 is operable to generate an acoustic stimulus for application to the user's ear, and detect or measure the response of the ear to the acoustic stimulus. For example, the acoustic stimulus may be in the sonic range, or ultra-sonic. In some embodiments, the acoustic stimulus may have a flat frequency spectrum, or be preprocessed in such a way that those frequencies that allow for a good discrimination between individuals are emphasized (i.e. have a higher amplitude than other frequencies). Alternatively, the acoustic stimulus may correspond to a normal playback signal (e.g. music). The measured response corresponds to the reflected signal received at the one or more microphones, with certain frequencies being reflected at higher amplitudes than other frequencies owing to the particular response of the user's ear.

The biometric system 204 may send suitable control signals to the personal audio device 202, so as to initiate the acquisition of biometric data, and receive data from the personal audio device 202 corresponding to the measured response. The biometric system 204 is operable to extract one or more features from the measured response and utilize those features as part of a biometric process.

Some examples of suitable biometric processes include biometric enrolment and biometric authentication. Enrolment comprises the acquisition and storage of biometric data which is characteristic of an individual. In the present context, such stored data may be known as a "voice print" or an "ear print". Authentication comprises the acquisition of biometric data from an individual, and the comparison of that data to the stored data of one or more enrolled or authorised users. A positive comparison (i.e. the acquired data matches or is sufficiently close to a stored voice or ear print) results in the individual being authenticated. For example, the individual may be permitted to carry out a restricted action, or granted access to a restricted area or device. A negative comparison (i.e. the acquired data does not match or is not sufficiently close to a stored voice or ear print) results in the individual not being authenticated. For example, the individual may not be permitted to carry out the restricted action, or granted access to the restricted area or device.

The biometric system 204 may, in some embodiments, form part of the personal audio device 202 itself. Alternatively, the biometric system 204 may form part of an electronic host device (e.g. an audio player) to which the personal audio device 202 is coupled, through wires or wirelessly. In yet further embodiments, operations of the biometric system 204 may be distributed between circuitry in the personal audio device 202 and the electronic host device.

Figure 3A:
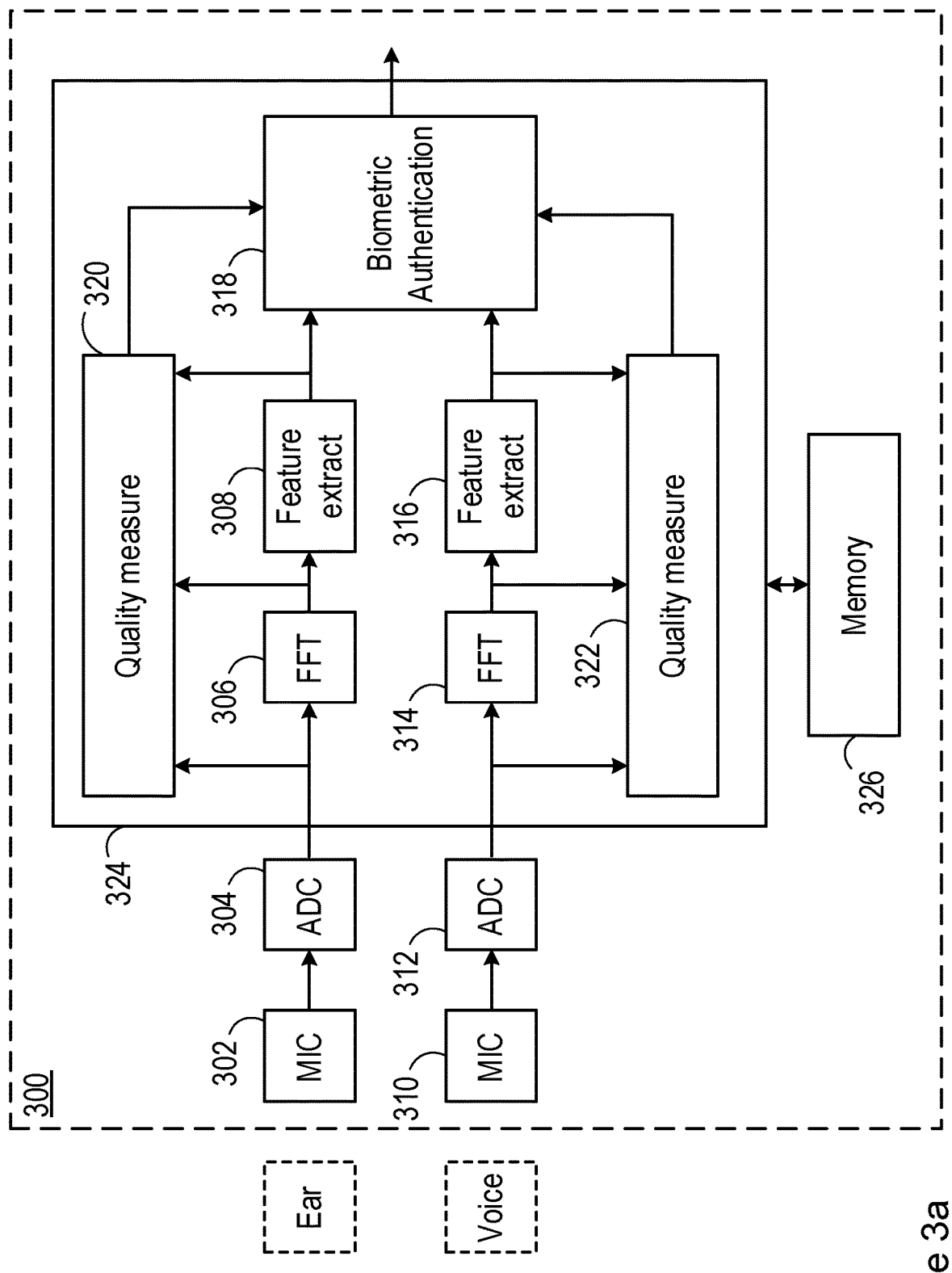
FIG. 3a shows a system according to embodiments of the disclosure.

FIG. 3a shows a system 300 according to embodiments of the disclosure.

The system 300 comprises processing circuitry 324, which may comprise one or more processors, such as a central processing unit or an applications processor (AP), or a digital signal processor (DSP). The system 300 further comprises memory 326, which is communicably coupled to the processing circuitry 324. The memory 326 may store instructions which, when carried out by the processing circuitry 324, cause the processing circuitry to carry out one or more methods as described below (see FIG. 4 for example).

The one or more processors may perform methods as described herein on the basis of data and program instructions stored in memory 324. Memory 324 may be provided as a single component or as multiple components or co-integrated with at least some of processing circuitry 322. Specifically, the methods described herein can be performed in processing circuitry 322 by executing instructions that are stored in non-transient form in the memory 324, with the program instructions being stored either during manufacture of the system 300 or personal audio device 202 or by upload while the system or device is in use.

The system 300 comprises a first microphone 302, which may belong to a personal audio device (i.e. as described above). The first microphone 302 may be configurable for placement within or adjacent to a user's ear in use, and is termed "ear microphone 302" hereinafter. The ear microphone 302 may be operable to detect bone-conducted voice signals from the user, as described above.

The processing circuitry 324 comprises an analogue-to-digital converter (ADC) 304, which receives the electrical audio signal detected by the ear microphone and converts it from the analogue domain to the digital domain. Of course, in alternative embodiments the ear microphone 302 may be a digital microphone and produce a digital data signal (which does not therefore require conversion to the digital domain).

The signal is detected by the ear microphone 302 in the time domain. However, the features extracted for the purposes of the biometric process may be in the frequency domain (in that it is the frequencies of the user's voice which are characteristic). The processing circuitry 324 therefore comprises a Fourier transform module 306, which converts the reflected signal to the frequency domain. For example, the Fourier transform module 306 may implement a fast Fourier transform (FFT).

The transformed signal is then passed to a feature extract module 308, which extracts one or more features of the transformed signal for use in a biometric process (e.g. biometric enrolment, biometric authentication, etc). For example, the feature extract module 308 may extract one or more mel frequency cepstrum coefficients. Alternatively, the feature extract module may determine the amplitude or energy of the user's voice at one or more predetermined frequencies, or across one or more ranges of frequencies. The extracted features may correspond to data for a model of the user's voice.

The extracted feature(s) are passed to a biometric module 318, which performs a biometric process on them. For example, the biometric module 318 may perform a biometric enrolment, in which the extracted features (or parameters derived therefrom) are stored as part of biometric data which is characteristic of the individual. The biometric data may be stored within the system or remote from the system (and accessible securely by the biometric module 318). Such stored data may be known as a "voice print". In another example, the biometric module 318 may perform a biometric authentication, and compare the one or more extracted features to corresponding features in the stored voice print (or multiple stored voice prints).

The system 300 further comprises a second microphone 310, which may belong to the personal audio device (i.e. as described above). The second microphone 310 may be configurable for placement external to the user's ear in use. The second microphone 310 is termed "voice microphone 310" hereinafter. The voice microphone 310 may be operable to detect air-conducted voice signals from the user, as described above.

The processing circuitry 324 comprises an ADC 312, a Fourier transform module 314 and a feature extract module 316, which are operable to act on the signal generated by the voice microphone 310 in a similar manner to the ADC 304, the Fourier transform module 306 and the feature extract module 308 described above.

The biometric module 318 may thus receive the features extracted from the signals generated by the microphones 302 and 310. In some embodiments of the disclosure, the biometric module 318 is operable to combine the data from both modules 308 and 316 to determine an overall authentication result.

The authentication may be carried out on the combination of data in multiple different ways. For example, in one embodiment separate authentication algorithms may be carried out on each of the sets of data produced by modules 308 and 316, and separate authentication scores acquired from each of the sets of data. The scores may then be combined to generate an overall score, indicating the overall likelihood that the user is an authorised user, with the authentication decision being taken on this score (e.g. by comparing the score to a threshold). In an alternative embodiment, the individual biometric scores may be handled separately (e.g., compared to separate thresholds) and individual authentication decisions being taken on each score. Overall authentication is then based on a combination of the decisions. For example, failure at any one of the authentication algorithms may result in failure of the authentication overall. Thus, if the bone-conducted authentication algorithm results in a positive authentication, but the voice-conducted authentication algorithm results in a rejection, the user may be rejected overall.

In the former embodiment, where the biometric authentication scores are combined to produce an overall biometric score, the individual biometric authentication scores may be combined by simple summing.

Alternatively, the biometric scores may be subject to a weighted summation, with each biometric score weighted by a respective coefficient. For example, one method of achieving such weighting is as follows:

$$S_{total} = p_1 s_1 + p_2 s_2$$

where $S_{total}$ is the total (i.e. combined, overall) biometric score, $s_1$ and $s_2$ are the biometric scores obtained via the separate authentication algorithms (e.g. bone-conducted voice and air-conducted voice, respectively), $p_1$ and $p_2$ are weighting coefficients, and $p_1 + p_2 = 1$. The biometric scores $s_1$ and $s_2$ may also take values between 0 and 1.

The weighting coefficients may be fixed, or dynamically adjustable. For example, in one embodiment the weighting coefficients may be determined based on one or more quality metrics related to the biometric data.

Thus in one embodiment the processing circuitry comprises quality measure modules 320 and 322. A first quality measure module 320 is coupled to the signal processing chain for processing the ear microphone signal. A second quality measure module 322 is coupled to the signal processing chain for processing the voice microphone signal. Each quality measure module 320, 322 may be coupled to the signal processing chains in one or more places, and operable to receive the outputs of one or more of: the microphones 302, 310; the ADCs 304, 312; the Fourier transform modules 306, 314; and the feature extract modules 308, 316.

The quality metrics may therefore relate to the signal in the time domain, the frequency domain, or the extracted features.

The one or more quality metrics may comprise one or more of: signal to noise ratio; the presence of clipping in the signal; one or more spectral parameters (such as spectral peaking, spectral flatness, spectral tilt, etc); energy per frequency bin, etc. Thus if the quality of one of the sets of biometric data is low (or relatively low compared to the other biometric data), the weighting coefficients may be adjusted to emphasize the biometric score for the higher-quality biometric algorithm.

In one particular example, if the SNR ratio for the voice microphone signal is low (i.e. noise is high), the weighting applied to the ear microphone authentication may be relatively high (and/or the weighting applied to the voice microphone authentication relatively low). If the SNR ratio for the voice microphone signal is high (i.e. noise is low), the weighting applied to the ear microphone authentication may be relatively low (and/or the weighting applied to the voice microphone authentication relatively high). In some embodiments, even though the weightings are dynamically adjustable, the weightings may be defined such that one authentication algorithm is always or generally preferred over the other. For example, the air-conducted voice algorithm may be preferred over the bone-conducted voice algorithm, or the bone-conducted voice algorithm may be preferred over the air-conducted voice algorithm (even though the weightings may change with changing quality metrics, etc).

Thus FIG. 3a shows an embodiment in which the bone-conducted voice biometric algorithm is combined with an air-conducted voice biometric algorithm.

Figure 3B:
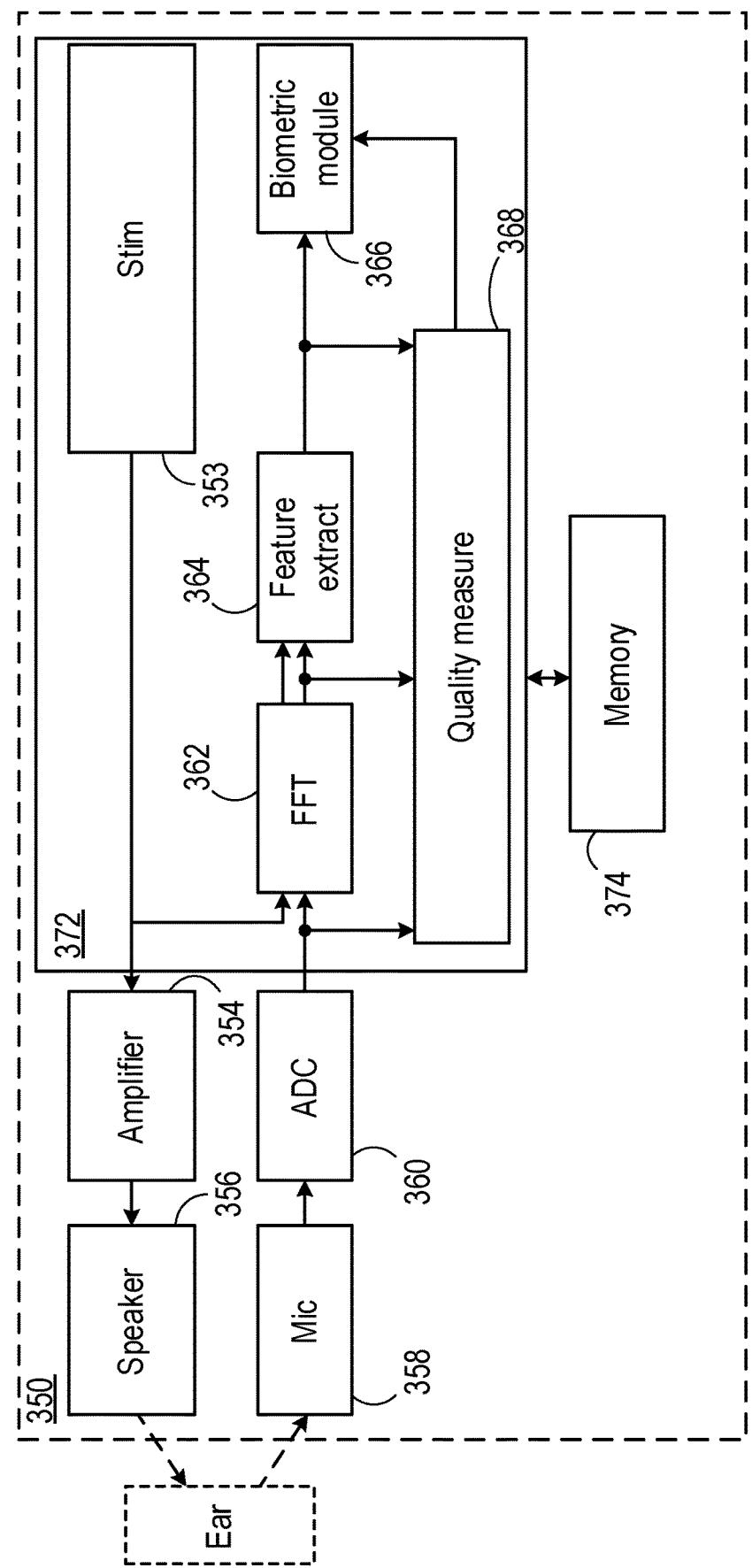
FIG. 3b shows a system according to further embodiments of the disclosure.

FIG. 3b shows a system 350 in which the bone-conducted voice biometric algorithm is combined with an ear biometric algorithm.

The system 350 comprises processing circuitry 372, which may comprise one or more processors, such as a central processing unit or an applications processor (AP), or a digital signal processor (DSP). The system 350 further comprises memory 374, which is communicably coupled to the processing circuitry 372. The memory 374 may store instructions which, when carried out by the processing circuitry 372, cause the processing circuitry to carry out one or more methods as described below (see FIG. 4 for example).

The processing circuitry 372 comprises a stimulus generator module 353 which is coupled directly or indirectly to an amplifier 354, which in turn is coupled to a loudspeaker 356. The loudspeaker 356 may be provided in a personal audio device, such as any of the personal audio devices described above with respect to FIGS. 1a to 1f, for example.

The stimulus generator module 353 generates an electrical audio signal and provides the electrical audio signal to the amplifier 354, which amplifies it and provides the amplified signal to the loudspeaker 356. The loudspeaker 356 generates a corresponding acoustic signal which is output to the user's ear (or ears). The audio signal may be sonic or ultra-sonic, for example. The audio signal may have a flat frequency spectrum, or be preprocessed in such a way that those frequencies that allow for a good discrimination between individuals are emphasized (i.e. have a higher amplitude than other frequencies).

As noted above, the audio signal may be output to all or a part of the user's ear (i.e. the auricle or the ear canal). The audio signal is reflected off the ear, and the reflected signal (or echo signal) is detected and received by a microphone 358. The reflected signal thus comprises data which is characteristic of the individual's ear, and suitable for use as a biometric.

The reflected signal is passed from the microphone 358 to an analogue-to-digital converter (ADC) 360, where it is converted from the analogue domain to the digital domain. Of course, in alternative embodiments the microphone may be a digital microphone and produce a digital data signal (which does not therefore require conversion to the digital domain).

The signal is detected by the microphone 358 in the time domain. However, the features extracted for the purposes of the biometric process may be in the frequency domain (in that it is the frequency response of the user's ear which is characteristic). The system 350 therefore comprises a Fourier transform module 362, which converts the reflected signal to the frequency domain. For example, the Fourier transform module 362 may implement a fast Fourier transform (FFT).

The transformed signal is then passed to a feature extract module 364, which extracts one or more features of the transformed signal for use in a biometric process (e.g. biometric enrolment, biometric authentication, etc), as described above with respect to FIG. 3a. For example, the feature extract module 364 may extract the resonant frequency of the user's ear. For example, the feature extract module 364 may extract one or more mel frequency cepstrum coefficients. Alternatively, the feature extract module may determine the frequency response of the user's ear at one or more predetermined frequencies, or across one or more ranges of frequencies. The extracted features may correspond to data for a model of the ear.

The extracted feature(s) are passed to a biometric module 366, which performs a biometric process on them, in a similar manner to the biometric module 318 described above. For example, the biometric module 366 may perform a biometric enrolment, in which the extracted features (or parameters derived therefrom) are stored as part of biometric data which is characteristic of the individual. The biometric data may be stored within the system or remote from the system (and accessible securely by the biometric module 366). Such stored data may be known as an "ear print". In another example, the biometric module 366 may perform a biometric authentication, and compare the one or more extracted features to corresponding features in the stored ear print (or multiple stored ear prints).

In some embodiments the stimulus waveforms may be tones of predetermined frequency and amplitude. In other embodiments the stimulus generator may be configurable to apply music to the loudspeaker, e.g. normal playback operation, and the feature extract module may be configurable to extract the response or transfer function from whatever signal components the stimulus waveform contains.

Thus in some embodiments the feature extract module may be designed with foreknowledge of the nature of the stimulus, for example knowing the spectrum of the applied stimulus signal, so that the response or transfer function may be appropriately normalised. In other embodiments the feature extract module may comprise a second input to monitor the stimulus (e.g. playback music) and hence provide the feature extract module with information about the stimulus signal or its spectrum so that the feature extract module may calculate the transfer function from the stimulus waveform stimulus to received acoustic waveform from which it may derive the desired feature parameters. In the latter case, the stimulus signal may also pass to the feature extract module via the FFT module.

The microphone 358 is further operable to detect bone-conducted voice signal from the user, as noted above. Thus, when the user is speaking (for example as detected by a voice activity detector), the same processing chain may be utilized to perform a voice biometric algorithm on the audio signal detected by the microphone 358. The voice activity detector may therefore be utilized to switch the signalling chain between ear biometric processing and voice biometric processing.

As with the biometric module 318, the biometric module 366 is thus operable to receive ear biometric data and bone-conducted voice biometric data, and perform authentication of the user based on a combination of the ear biometric data and the bone-conducted voice data.

Again, the authentication may be carried out on the combination of data in multiple different ways. In one embodiment separate authentication algorithms may be carried out on each of the sets of data, and separate authentication scores acquired from each of the sets of data. The scores may then be combined to generate an overall score, indicating the overall likelihood that the user is an authorised user, with the authentication decision being taken on this score (e.g. by comparing the score to a threshold). In an alternative embodiment, the individual biometric scores may be handled separately (e.g., compared to separate thresholds) and individual authentication decisions being taken on each score. Overall authentication is then based on a combination of the decisions. For example, failure at any one of the authentication algorithms may result in failure of the authentication overall. Thus, if the bone-conducted authentication algorithm results in a positive authentication, but the ear authentication algorithm results in a rejection, the user may be rejected overall.

In the former embodiment, where the biometric authentication scores are combined to produce an overall biometric score, the individual biometric authentication scores may be combined by simple summing, or weighted summation. In the latter case, the weighting coefficients may be fixed, or determined according to one or more quality metrics derived from the microphone signal. The processing circuitry 372 may therefore comprise a quality measure module 368, which carries out substantially the same function as either of quality measure modules 320 and 322.

Figure 4:
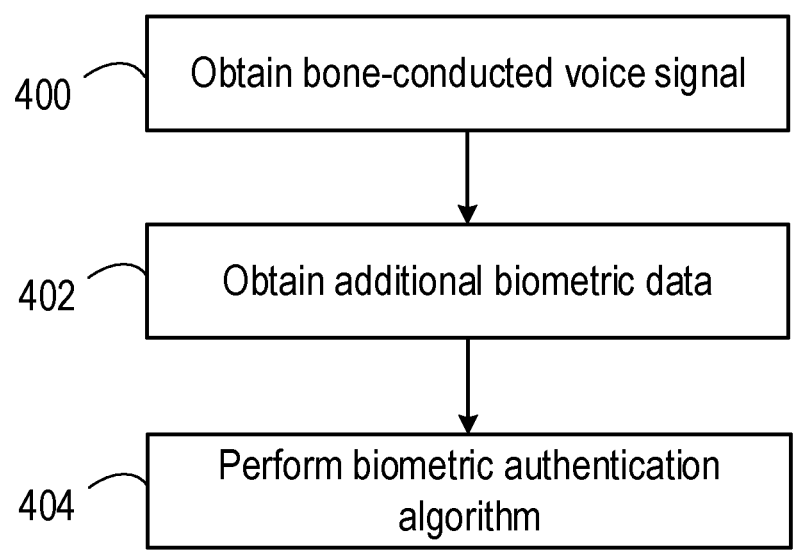
FIG. 4 is a flowchart of a method according to embodiments of the disclosure.

FIG. 4 is a flowchart of a method according to embodiments of the disclosure.

In step 400, bone-conducted voice biometric data is acquired from a user seeking authentication. For example, the biometric system may acquire bone-conducted voice biometric data from a personal audio device, which comprises one or more microphones positioned, in use, within or adjacent to a user's ear canal.

In step 402, optionally, additional authentication data is obtained from the user. For example, in some embodiments, the additional authentication data may comprise air-conducted voice biometric data obtained via another microphone which, in use, is external to the user's ear. For example, the air-conducted voice biometric data may be obtained from a dedicated voice microphone.

In other embodiments, the additional authentication data may comprise ear biometric data. For example, the biometric system may acquire ear model data from a personal audio device, which generates an acoustic stimulus for application to the user's ear, and extract one or more features from the measured response to that acoustic stimulus (e.g. as detected with a microphone in the personal audio device).

In step 404, the user is authenticated based at least on the bone-conducted voice biometric data obtained in step 400. For example, a voice biometric algorithm may compare the extracted features of the bone-conducted voice signal to stored voice prints for one or more authorised users, and generate a biometric authentication score indicating the level of similarity (closeness) between the extracted data and the stored data. If the score equals or exceeds a threshold, the user may be authenticated.

In alternative embodiments, the user may be authenticated based on the bone-conducted voice biometric data obtained in step 400 and the additional authentication data obtained in step 402.

The authentication may be carried out on the combination of data in multiple different ways. For example, in one embodiment separate authentication algorithms may be carried out on each of the sets of data acquired in steps 400 and 402, and separate authentication scores acquired from each of the sets of data. The scores may then be combined to generate an overall score, indicating the overall likelihood that the user is an authorised user, with the authentication decision being taken on this score (e.g. by comparing the score to a threshold). The individual scores may be weighted prior to their combination, for example, based on quality metrics associated with the respective sets of biometric data.

In an alternative embodiment, the individual biometric scores may be handled separately (e.g., compared to separate thresholds) and individual authentication decisions taken on each score. Overall authentication is then based on a combination of the decisions. For example, failure at any one of the authentication algorithms may result in failure of the authentication overall. Thus, if the ear biometric algorithm results in an authentication, but one or more of the other mechanisms results in a rejection (i.e. because the voice does not match a stored voice print for the user, or the response to the security question was wrong), the user may be rejected overall.

Embodiments of the disclosure thus provide methods, apparatus and systems for authenticating a user.

Embodiments may be implemented in an electronic, portable and/or battery powered host device such as a smartphone, an audio player, a mobile or cellular phone, a handset. Embodiments may be implemented on one or more integrated circuits provided within such a host device. Alternatively, embodiments may be implemented in a personal audio device configurable to provide audio playback to a single person, such as a smartphone, a mobile or cellular phone, headphones, earphones, etc. See FIGS. 1a to 1f. Again, embodiments may be implemented on one or more integrated circuits provided within such a personal audio device. In yet further alternatives, embodiments may be implemented in a combination of a host device and a personal audio device. For example, embodiments may be implemented in one or more integrated circuits provided within the personal audio device, and one or more integrated circuits provided within the host device.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure makes reference to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments and implementations likewise, with the benefit of this disclosure, will be apparent to those having ordinary skill in the art, and such embodiments should be deemed as being encompassed herein. Further, those having ordinary skill in the art will recognize that various equivalent techniques may be applied in lieu of, or in conjunction with, the discussed embodiments, and all such equivalents should be deemed as being encompassed by the present disclosure.

The skilled person will recognise that some aspects of the above-described apparatus and methods, for example the discovery and configuration methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

It should be noted that the above-mentioned embodiments illustrate rather than limit the invention, and that those skilled in the art will be able to design many alternative embodiments without departing from the scope of the appended claims or embodiments. The word "comprising" does not exclude the presence of elements or steps other than those listed in a claim or embodiment, "a" or "an" does not exclude a plurality, and a single feature or other unit may fulfil the functions of several units recited in the claims or embodiments. Any reference numerals or labels in the claims or embodiments shall not be construed so as to limit their scope.

Although the present disclosure and certain representative advantages have been described in detail, it should be understood that various changes, substitutions, and alterations can be made herein without departing from the spirit and scope of the disclosure as defined by the appended claims or embodiments. Moreover, the scope of the present disclosure is not intended to be limited to the particular embodiments of the process, machine, manufacture, compositions of matter, means, methods, or steps, presently existing or later to be developed that perform substantially the same function or achieve substantially the same result as the corresponding embodiments herein may be utilized. Accordingly, the appended claims or embodiments are intended to include within their scope such processes, machines, manufacture, compositions of matter, means, methods, or steps.

The invention claimed is:

1. A method of biometric authentication, comprising:
obtaining an audio signal comprising a representation of a voice signal of a user conducted via at least part of the user's skeleton;
obtaining acoustic ear biometric data related to the user's ear, wherein the step of obtaining ear biometric data comprises:
initiating an acoustic stimulus for application to the user's ear via a loudspeaker; and
extracting one or more features from a measured response to the acoustic stimulus; and
performing a biometric authentication algorithm on the audio signal and the acoustic ear biometric data to authenticate the user.

2. The method according to claim 1, wherein the audio signal is generated by an in-ear transducer.

3. The method according to claim 1, wherein the audio signal is a first audio signal comprising a representation of a first voice signal, the method further comprising:
obtaining a second audio signal comprising a representation of a second voice signal of the user generated by a microphone which is external to an ear of the user, and
wherein the step of performing a biometric authentication algorithm on the first audio signal comprises performing a biometric authentication algorithm on the first and second audio signals to authenticate the user.

4. The method according to claim 3, wherein performing the biometric authentication algorithm on the first and second audio signals comprises calculating a first biometric authentication score for the first audio signal, calculating a second biometric authentication score for the second audio signal, and combining the first and second biometric authentication scores.

5. The method according to claim 4, wherein the first and second biometric authentication scores are weighted as a function of one or more conditions.

6. The method according to claim 5, wherein the one or more conditions comprise a level of noise in at least the second audio signal.

7. The method according to claim 6, wherein the first and second biometric authentication scores are weighted such that a greater weighting is applied to the first authentication score for higher levels of noise in the second audio signal, and a smaller weighting is applied to the first authentication score for lower levels of noise in the second audio signal.

8. The method according to claim 6, wherein the first and second biometric authentication scores are weighted such that a greater weighting is applied to the second authentication score for lower levels of noise in the second audio signal, and a smaller weighting is applied to the second authentication score for higher levels of noise in the second audio signal.

9. The method according to claim 1, wherein the acoustic stimulus comprises an audio playback signal.

10. The method according to claim 9, wherein the audio playback signal comprises music.

11. The method according to claim 1, wherein the ear biometric data is obtained by a personal audio device.

12. The method according to claim 11, wherein the ear biometric data is obtained by a microphone in the personal audio device.

13. The method according to claim 12, wherein the microphone is further utilized as part of an active noise cancellation system.

14. An apparatus for performing one or more biometric processes, comprising:
a first input for obtaining an audio signal comprising a representation of a voice signal of a user conducted via at least part of the user's skeleton;
a second input for obtaining acoustic ear biometric data related to the user's ear by:
initiating an acoustic stimulus for application to the user's ear via a loudspeaker; and
extracting one or more features from a measured response to the acoustic stimulus; and
a biometric module for performing a biometric authentication algorithm on the audio signal and the ear biometric data to authenticate the user.

15. The apparatus according to claim 14, wherein the audio signal is a first audio signal comprising a representation of a first voice signal, the apparatus further comprising:
a third input for obtaining a second audio signal comprising a representation of a second voice signal of the user generated by a microphone which is external to an ear of the user,
wherein the biometric module is configured to perform a biometric authentication algorithm on at least the first and second audio signals to authenticate the user.

16. The apparatus according to claim 15, wherein the biometric module is configured to perform the biometric authentication algorithm on the first and second audio signals by calculating a first biometric authentication score for the first audio signal, calculating a second biometric authentication score for the second audio signal, and combining the first and second biometric authentication scores.

17. A non-transitory machine-readable medium storing instructions which, when executed by processing circuitry, cause an electronic apparatus to:
obtain an audio signal comprising a representation of a voice signal of a user conducted via at least part of the user's skeleton;
obtain acoustic ear biometric data related to the user's ear by:
initiating an acoustic stimulus for application to the user's ear via a loudspeaker; and
extracting one or more features from a measured response to the acoustic stimulus; and
perform a biometric authentication algorithm on the audio signal and the acoustic ear biometric data to authenticate the user.

* * * * *